(12) United States Patent
Jeong et al.

(10) Patent No.: US 8,277,104 B2
(45) Date of Patent: Oct. 2, 2012

(54) LED BACK-LIGHT UNIT AND DISPLAY DEVICE

(75) Inventors: Chan Sung Jeong, Gyeonggi-do (KR); Jung Nam An, Gyeonggi-do (KR); Min Ho Kim, Gyeonggi-do (KR); Seung Se Kim, Gyeonggi-do (KR); Hoon Hur, Gyeonggi-do (KR); Won Do Kee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 422 days.

(21) Appl. No.: 12/704,357

(22) Filed: Feb. 11, 2010

(65) Prior Publication Data

US 2010/0302805 A1 Dec. 2, 2010

(30) Foreign Application Priority Data

Jun. 2, 2009 (KR) .................. 10-2009-0048571

(51) Int. Cl.
*F21V 7/04* (2006.01)

(52) U.S. Cl. ......... 362/601; 362/606; 362/612; 362/620

(58) Field of Classification Search ................ 362/97.1, 362/97.3, 317, 601, 606, 608–621, 623, 625; 349/62, 64, 65; 345/1.1, 1.3
See application file for complete search history.

(56) References Cited

U.S. PATENT DOCUMENTS

| | | | | |
|---|---|---|---|---|
| 6,412,968 B1 * | 7/2002 | Ohkawa | ........................ | 362/26 |
| 6,921,178 B2 * | 7/2005 | Ohkawa | ........................ | 362/620 |
| 7,311,431 B2 * | 12/2007 | Chew et al. | .................... | 362/613 |
| 7,458,709 B2 * | 12/2008 | Lang et al. | ..................... | 362/612 |
| 7,465,083 B2 * | 12/2008 | Ohkawa | ........................ | 362/616 |
| 7,961,271 B2 * | 6/2011 | Tomita et al. | .................... | 349/65 |
| 8,092,064 B2 * | 1/2012 | Erchak et al. | ................. | 362/613 |
| 8,154,689 B2 * | 4/2012 | Ajichi et al. | .................... | 349/65 |
| 2001/0053072 A1 * | 12/2001 | Takemoto | ........................ | 362/31 |
| 2006/0245213 A1 * | 11/2006 | Beil et al. | ........................ | 362/616 |
| 2008/0205078 A1 * | 8/2008 | Karlicek et al. | ............... | 362/612 |
| 2009/0296026 A1 * | 12/2009 | Bae et al. | ........................ | 349/65 |
| 2011/0026239 A1 * | 2/2011 | Kim et al. | .................... | 362/97.1 |

FOREIGN PATENT DOCUMENTS

| | | | |
|---|---|---|---|
| JP | 2006-134748 A | | 5/2006 |
| JP | 2007-293339 A | | 11/2007 |
| JP | 2008-108622 A | | 5/2008 |
| JP | 2008-192395 A | | 8/2008 |

* cited by examiner

*Primary Examiner* — Hargobind S Sawhney

(74) *Attorney, Agent, or Firm* — Birch, Stewart, Kolasch & Birch, LLP

(57) ABSTRACT

A back-light unit including a plurality of substrates, a plurality of light sources respectively disposed on the plurality of substrates and configured to emit light, and N (N≧2) light guide plates respectively disposed adjacent to the plurality of light sources, each light guide plate including a light incidence part having a light incidence surface for receiving light emitted in a first direction from a corresponding light source, and a light emission part for emitting the received incident light in a second direction different than the first direction. Further, at least one of the light guide plates includes light-extracting surface patterns disposed on the light emission part, and the light-extracting surface patterns comprise a first region of light-extracting surface patterns having a higher pattern-density than a second region of light-extracting surface patterns next to the first region.

19 Claims, 23 Drawing Sheets

LED BACK-LIGHT UNIT AND DISPLAY DEVICE

This application claims the benefit of Korean Patent Application No. 10-2009-0048571, filed on Jun. 2, 2009, which is hereby incorporated by reference as if fully set forth herein.

BACKGROUND OF THE INVENTION

1. Field of the Invention

The present application relates to a back-light unit using light emitting diodes (LEDs) for a light source, and a display device including the back-light unit.

2. Discussion of the Related Art

A liquid crystal display (LCD) is used in various devices such as televisions, laptop computers, monitors for desktop computers, and mobile phones. Because the LCD is not a self-emitting light source, the LCD includes a back-light unit. The back-light unit forms a uniform surface light source, and provides the light to a liquid crystal panel included in the LCD.

In more detail, the back-light unit includes a light source, a light guide plate, a diffusion sheet, a prism, and a protection sheet. A fluorescent lamp such as a cold cathode fluorescent lamp (CCFL) or a light emitting diode may also be used for the light source.

SUMMARY OF THE INVENTION

Accordingly, one object of the present application is to provide a light emitting diode (LED) back-light unit and a display device that substantially obviate one or more problems due to limitations and disadvantages of the related art.

Another object of the present application is to provide a back-light unit that improves light uniformity and a display device having the same.

To achieve these objects and other advantages and in accordance with the purpose of the present application, as embodied and broadly described herein, the present invention provides in one aspect A back-light unit including a plurality of substrates, a plurality of light sources respectively disposed on the plurality of substrates and configured to emit light, and N (N≧2) light guide plates respectively disposed adjacent to the plurality of light sources, each light guide plate including a light incidence part having a light incidence surface for receiving light emitted in a first direction from a corresponding light source, and a light emission part for emitting the received incident light in a second direction different than the first direction. Further, at least one of the light guide plates comprises light-extracting surface patterns disposed on the light emission part, and the light-extracting surface patterns comprise a first region of light-extracting surface patterns having a higher pattern-density than a second region of light-extracting surface patterns next to the first region.

In another aspect, the present invention provides a back-light unit including a plurality of substrates, a plurality of light sources respectively disposed on the plurality of substrates and configured to emit light, and N (N≧2) light guide plates respectively disposed adjacent to the plurality of light sources, each light guide plate including a light incidence part having a light incidence surface for receiving light emitted in a first direction from a corresponding light source, and a light emission part for emitting the received incident light in a second direction different than the first direction. Further, at least one of the light guide plates includes light-extracting surface patterns disposed on the light emission part, and the light-extracting surface patterns include a predetermined region of light-extracting surface patterns of a K-th (K=1, 2, ..., N−1) one of the light guide plates, which is adjacent to the light incidence part of a "K+1"-th one of the light guide plates, having a higher pattern-density than the other region of light-extracting surface patterns of the K-th one of the light guide plates.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the present application and are incorporated in and constitute a part of the present application, illustrate embodiment(s) of the present application and together with the description serve to explain the principle of the present application. In the drawings.

DETAILED DESCRIPTION OF THE INVENTION

Figure 1:
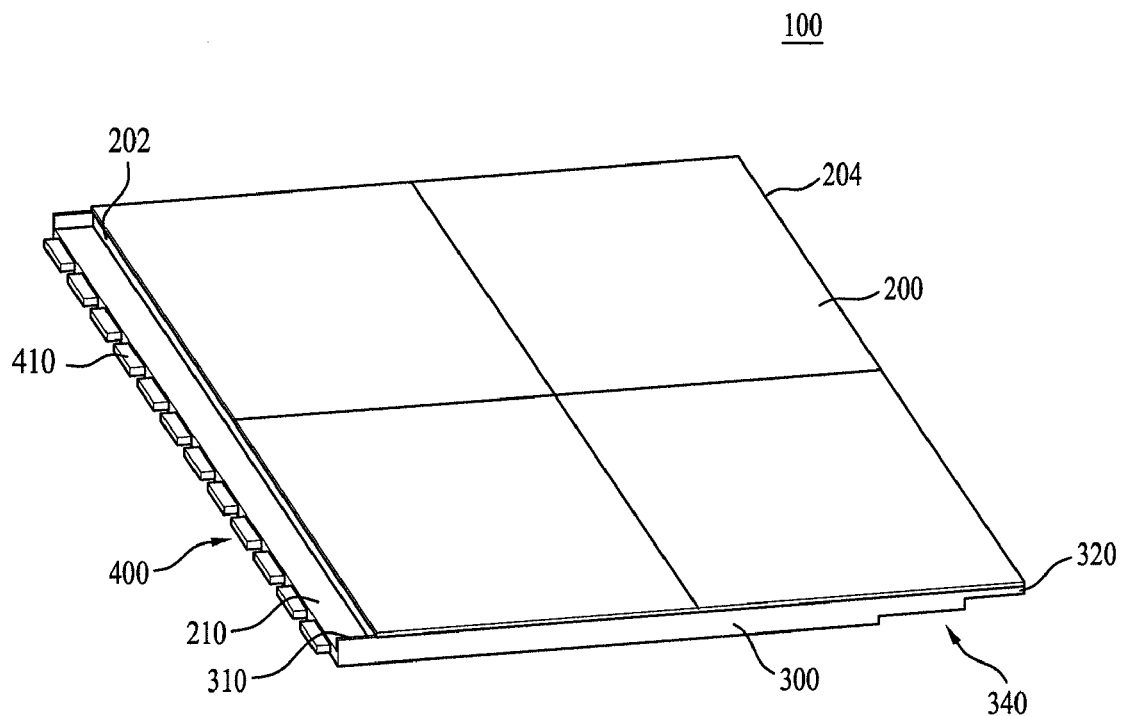
FIG. 1 is a perspective view illustrating a back-light unit according to an embodiment of the present invention.

The present invention now will be described more fully hereinafter with reference to the accompanying figures, in which embodiments of the invention are shown.

The present invention may, however, be embodied in many alternate forms and should not be construed as limited to the embodiments set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

Further, when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items. Also, although the terms first, second, etc. may be used herein to describe various elements, components, regions, layers and/or sections, these elements, components, regions, layers and/or sections should not be limited by these terms.

Figure 2:
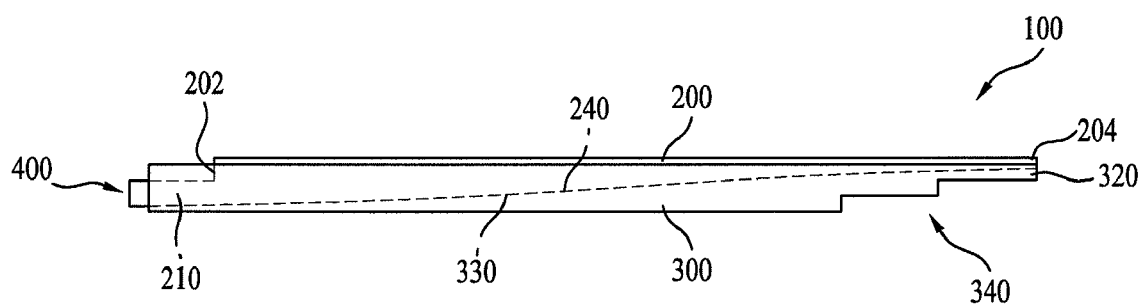
FIG. 2 is a side view illustrating a light guide plate and a reflection plate included the back-light unit according to an embodiment of the present invention.

FIG. 1 is a perspective view illustrating a back-light unit 100 according to an embodiment of the present invention, and FIG. 2 is a side view illustrating a light guide plate 200 and a reflection plate 300 in the back-light unit 100. As shown in FIGS. 1 and 2, the back-light unit 100 includes a plurality of light guide plates 200, and a plurality of reflection plates 300 respectively arranged beneath the light guide plates 200. Each light guide plate 200 also includes a light incidence part 210 to which light is incident. Further, the light incidence part 210 protrudes from a first side surface 202 of the light guide plate 200. The light guide plate 200 also has a second side surface 204 opposite to the first side surface 202. In laterally-adjacent ones of the light guide plates 200, the first and second side surfaces 202 and 204 face each other.

In addition, in each light guide plate 200, the first and second side surfaces 202 and 204 may have different thicknesses. For example, the thickness of the first side surface 202 where the light incidence part 210 is formed may be larger than the thickness of the second side surface 204 arranged opposite to the first side surface 202.

Figure 3:
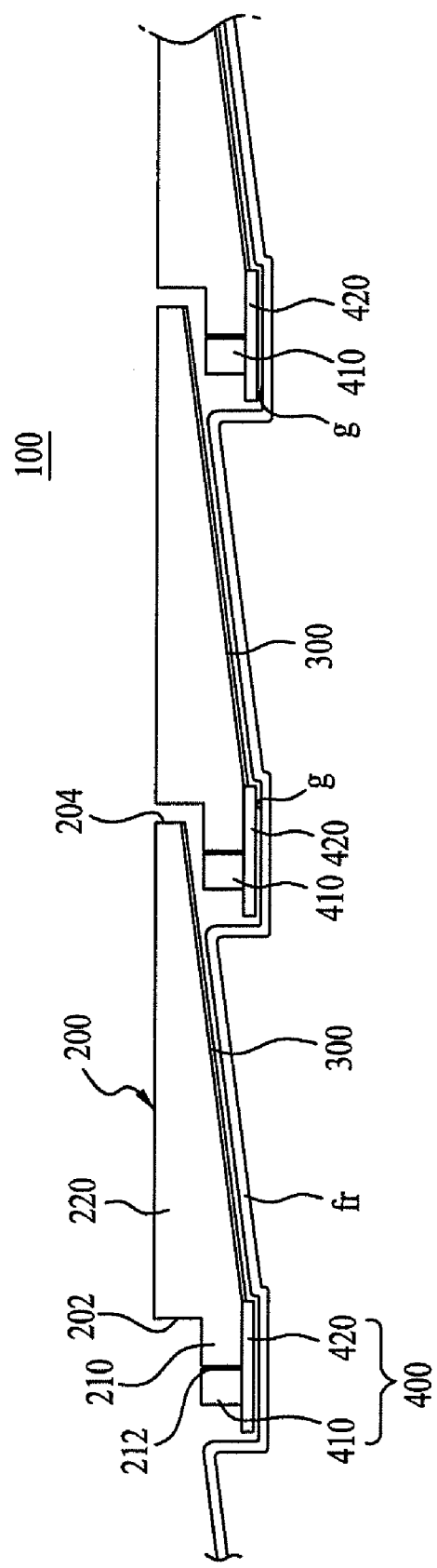
FIG. 3 is a sectional view illustrating a back-light unit according to another embodiment of the present invention.

As shown in FIG. 3, each light guide plate 200 also includes a light emission part 220. The light emission part 220 also has a portion having a thickness gradually reduced in a direction from the first side surface 202 to the second side surface 204, namely, as the portion extends from the light incident part 210.

As shown in FIGS. 1 to 3, the back-light unit 100 further includes a light source unit 400 arranged at the side of the light incidence part 210 of each light guide plate 200. The light source unit 400 includes a plurality of light emitting diodes (LEDs) 410 spaced apart from one another by a predetermined spacing. The LEDs 410 of the light source unit 400 may be mounted on a separate substrate.

In addition, light generated from the LEDs 410 is emitted through an upper surface of the light source unit 400, namely, a light emission surface. Each light emission part 220 may also include patterns to obtain a uniform brightness of light at the light emission surface thereof. In more detail, the patterns focus light emitted from the light emission surface to increase the brightness of the light. The patterns may also be formed to have a density reversely proportional to the brightness of light emitted from each unit region of the light emission surface under the condition in which there is no pattern in order to obtain a uniform brightness of light emitted from the light emission surface.

Further, the density of patterns means the number of patterns provided per unit area on the upper or lower surface of each light guide plate and/or each reflection plate 300. Therefore, the density of patterns may be a basis to determine how dense the patterns are.

As shown in FIGS. 2 and 3, the thickness reduction of each light guide plate 200 gradually made in a direction from the first side surface 202 to the second side surface 204 is reversely proportional to an increase in the distance between the LEDs 410 constituting the light source unit 400 and the light emission surface, in order to compensate for a reduction in the brightness of light.

However, it may be difficult to secure a desired uniformity of the brightness of light at the light emission surface using only the reducing thickness for the light emission plates. Therefore, an embodiment of the present invention provides a pattern forming method to compensate for a deviation of the brightness of light. For example, patterns having different densities may be formed at the upper or lower surface of each light guide plate 200 around the light emission parts 220.

In addition, the light guide plates 200 and reflection plates 300 can be coupled together such that they are in contact with each other or are spaced apart from each other. As shown in FIG. 2, the lower surface 240 of each light guide plate 200 and the upper surface 330 of the corresponding reflection plate 300 are inclined in opposite directions, and in this embodiment are positioned to be in contact with each other. Therefore, in this instance, the back-light unit or light guide unit 100 including the light guide plates 200 and reflection plates 300 has a planar structure having a uniform thickness. That is, the upper surface of each light guide plate 200 and the lower surface of each reflection plate 300 extend in parallel.

Figure 24:
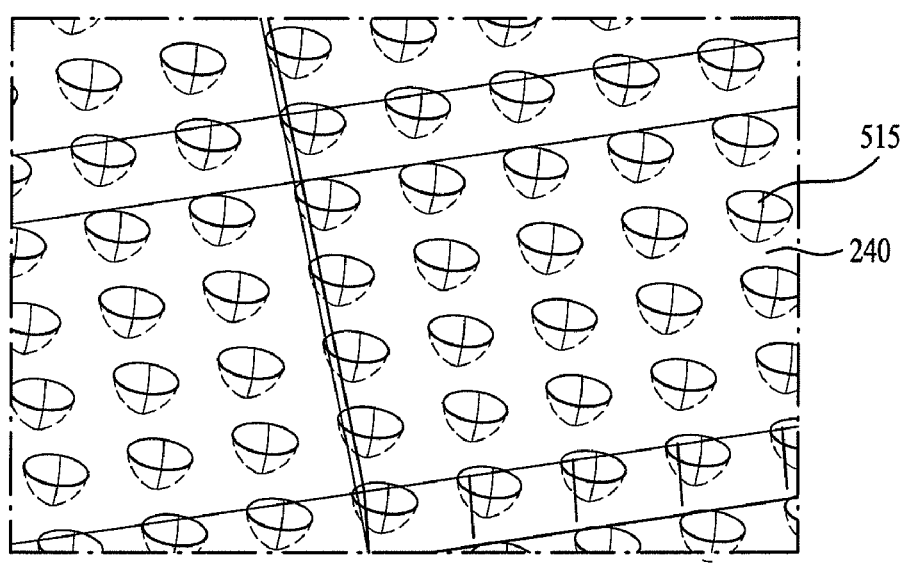

Further, as shown in FIG. 1, rims 310 are provided at opposite side surfaces of each reflection plate 300. Each rim 310 may also be coupled to at least a portion of the corresponding side surface of the corresponding light guide plate 200. In addition, the rims 310 may be arranged at the opposite side surfaces of the reflection plate 300 extending perpendicular to the light incidence part 210 of the corresponding light guide plate 200 as shown in FIG. 1. A single rim 310 may also be arranged at a selected one of the side surfaces of the reflection plate 300.

Where a plurality of back-light units or light guide units 100 are used as unit blocks, respectively, to constitute a large-size back-light unit in which adjacent ones of the unit blocks are coupled to each other as shown in FIG. 24, for example, the rims 310 may function to optically couple the adjacent back-light units or light guide units 100 to each other, and to control the optical coupling degree of the back-light units or light guide units 100. That is, with respect to each rim 310, a portion of each side surface of each light guide plate 200 may be positioned over the rim 310 without being coupled to the rim 310.

Further, as shown in FIGS. 1 and 2, an end 320 of each reflection plate 300 positioned opposite to the light incidence part 210 can control the optical coupling degree of the adjacent light guide units or blocks 100. Each reflection plate 300 also has a stepped lower end section 340 arranged below the end 320, to receive the light source unit 400 and light incidence part 210 of the light guide unit or block 100 arranged adjacent to the light guide unit or block 100 including the reflection plate 300. The lower end section 340 prevents a direct exposure of light emitted from the light source unit 400 and light incidence part 210 of the adjacent light guide unit or block 100.

As shown in FIG. 3, the back-light unit 100 according to an embodiment of the present invention includes light source units 400 including substrates 420 and light sources 410 arranged on each substrate 420 to emit light through a certain orientation angle in a first direction. The back-light unit also includes N (N≧2) light guide plates 200 each including a light incidence part 210 having a light incidence surface 212 to which light from the light source 410 is laterally incident, and a light emission part 220 from which the incident light is upwardly emitted. The light emission part 220 is connected at one side thereof to the light incidence part 210.

Further, as shown, at least a portion of the light emission part 220 in a K-th (K=1, 2, . . . , N−1) one of the light guide plates 200 is arranged over the light incidence part 210 of a "K+1"-th one of the light guide plates 200. The light emission part 220 of each light guide plate 200 also has a thickness gradually reduced as the light emission part 200 extends from one side adjacent to the light incidence part 210 of the light guide plate 200 to the other side opposite to the light incidence part 210 of the light guide plate 200. Each light guide plate 200 can also include surface patterns that are used to improve the brightness of light, for example.

The patterns may be scratches, micro-grooves or protrusions formed on an upper or lower surface of the light emission part 220 from which light incident to the light incidence surface 212 is emitted. The patterns also correspond to light extracting patterns functioning to focus light traveling while being fully reflected within the light guide plate 200, thereby increasing the brightness of light at the upper surface of the light guide plate 200, namely, the light emission surface. The patterns may also be integrally formed on the light guide plates 200, and the formation of the patterns on the upper and/or lower surface of the light guide plate 200 may be achieved using a bonding or printing method, as will be described later.

In addition, according to an embodiment of the present invention, the light guide plate 200 includes a density-reinforced region having a higher pattern-density than other regions around the density-reinforced region. The pattern-density of the density-reinforced region may also gradually increase. Further, the density-reinforced region may be arranged at the other region of the light emission part 220, namely, a region near the second side surface 204 opposite to the first side surface 202 of the light guide plate 200 from which the light incidence part 210 is protruded, or at a portion of the light emission part 220 adjacent to the light incidence part 210. This will be described in more detail later.

In addition, the back-light unit 100 according to an embodiment of the present invention may include a light guide plate unit including a plurality of light guide plates 200. In this instance, each light guide plate 200 includes the light source unit 400 including a plurality of light emitting diodes (LEDs) 410, the first side surface 202, the light incidence part 210, and the second side surface 204 opposing the first side surface 202. An end portion of each light guide plate 200 at the side of the second side surface 204 shields the LEDs 410 arranged adjacent to the first side surface 202 of another light guide plate 200 arranged adjacent to the former light guide plate 200 (see FIG. 3, for example).

As shown in FIG. 3, the first side surface 202 has a thickness larger than the thickness of the second side surface 204. As discussed above, patterns are also formed at or on the upper and/or lower surface of each light guide plate 200. The back-light unit 100 also includes a plurality of reflection plates 300 respectively arranged beneath the light guide plates 200. A density-reinforced region having a higher pattern-density than other regions around the density-reinforced region is also arranged on the upper or lower surface of each light guide plate 200.

Further, as shown in the embodiment in FIG. 3, the light incidence part 210 of each light guide plate 200 protrudes from a lower portion of the first side surface 202 of the light guide plate 200. The light guide plate 200 also has a shape in which the thickness of the light guide plate 200 is gradually reduced as the light guide plate 200 extends toward the second side surface 204.

Accordingly, when the light guide plates 200 having the above-described structure are arranged such that the light emission surfaces of the light guide plates 200 are horizontally flush with one another, the lower surfaces of the light guide plates 200 form a structure having alternately-repeated protrusions and recesses.

The LEDs 410 are also arranged to be laterally adjacent to a side surface of the light incidence part 210 protruded from the first side surface 202. The substrate 420 is also arranged beneath the light incidence part 210, and the LEDs 410 are arranged on the substrate 420. The substrate 420 is also included in the light source unit 400.

As shown in FIG. 3, a frame is arranged beneath the back-light unit 100 to support a lower portion of the back-light unit 100, which has alternately-repeated protrusions and recesses due to the light guide plates 200 and substrates 420. In the embodiment shown in FIG. 3, the frame includes recesses g to receive the substrates 420 arranged beneath the light incidence parts 210 of the light guide plates 200. Therefore, the substrates 420 may be stably maintained in a seated state.

Further, as shown in FIG. 3, the end portion of each light guide plate 200 at the side of the second side surface 204 overlaps with a portion of the light incidence part 210 of an adjacent light guide plate 200, and thus has a structure capable of shielding the LEDs 410 of the light source unit 400 in the adjacent light guide plate 200. In addition, because the reflection plates 300 are arranged beneath the light guide plates 200, the back-light unit 100 has a structure making it difficult to see the light sources when the back-light unit is observed in a vertical direction above the light emission surfaces, by virtue of the above-described overlapping structure. The reflection plates may also have a thin film or sheet structure.

Figure 4:
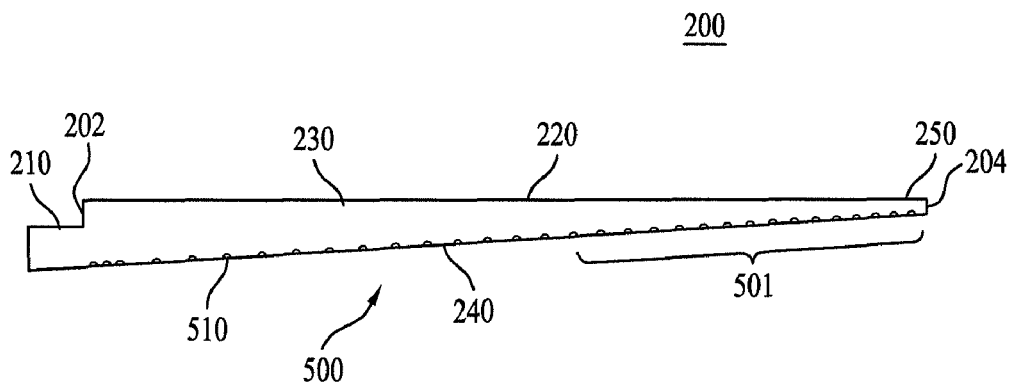
FIG. 4 is a sectional view illustrating a light guide plate including surface patterns according to an embodiment of the present invention.

Next, FIG. 4 is a sectional view illustrating a light guide plate constituting the back-light unit according to an embodiment of the present invention. As shown in FIG. 4, the light guide plate 200 includes the first side surface 202, from which the light incidence part 210 is protruded, the second side surface 204 opposing the first side surface 202, and side surfaces 230 (third and fourth side surfaces) coupled with the rims 310 of the reflection plate 300 (the rims 310 are shown in FIG. 1). In addition, the light incidence part 210 laterally protrudes from the first side surface 202.

Further, as discussed above, the light guide plate 200 has a thickness gradually reduced as it extends from the first side surface 202 to the second side surface 204. The light guide plate 200 also includes an upper surface from which light incident through the light incidence part 210 is emitted, namely, the light emission surface of the light emitting part 220 (hereinafter also referred to as the light emission surface 220), and an opposite surface, namely, a lower surface 240 coupled to an upper surface 330 of the reflection plate 300 (see FIG. 3).

As shown in FIG. 4, patterns 500 for light extraction are formed on at least one of the light emission surface 220 and the lower surface 240. In more detail, in the embodiment of FIG. 4, the patterns 500 are formed on the lower surface 240. However, the patterns 500 may be formed and arranged on the light emission surface 220 of the light guide unit 100. Alternatively, the patterns 500 may be formed arranged on both the light emission surface 220 and the lower surface 240. The patterns 500 may also be formed on a member separate from the light guide unit 100. In this instance, the patterns 500 may be provided as a separate layer arranged on the upper or lower surface of the light guide unit 100.

The patterns 500 can also be provided at the upper surface of the reflection plate 300 contacting the light guide plate 200. Further, in FIG. 4, the patterns 500 have repeated unit pattern structures 510 each having, for example, a dot shape. The density of the patterns 500 can also be varied in accordance with a position thereof on the light guide plate 200.

That is, in the embodiment of FIG. 4, the patterns 500 are formed such that the density of the patterns 500 increases as the light guide plate 200 extends toward the second side surface 204. Such an increase in the density of the patterns 500 compensates for a phenomenon that the intensity of light is reduced as the light guide plate 200 extends toward the second side surface 204.

Thus, it is possible to achieve an improvement in the uniformity of light emitted through the light emission surface 220 by controlling the emitted light in accordance with an adjustment in the density of the patterns 500. In the embodiment shown in FIG. 4, the light guide plate 200 also includes a density-increased region 501 where the density of the pattern 500 is gradually increased from an average density of the patterns 500. In more detail, the density-increased region 501 corresponds to a region where the density of the patterns 500 is locally or gradually increased from the average density of the patterns 500.

That is, the density-reinforced region formed on the back-light unit or each light guide plate in accordance with an embodiment of the present invention may include a density-increased region (band type or region type) where the density of patterns is locally increased, or a density-increased region where the density of patterns is gradually increased.

Figure 5:
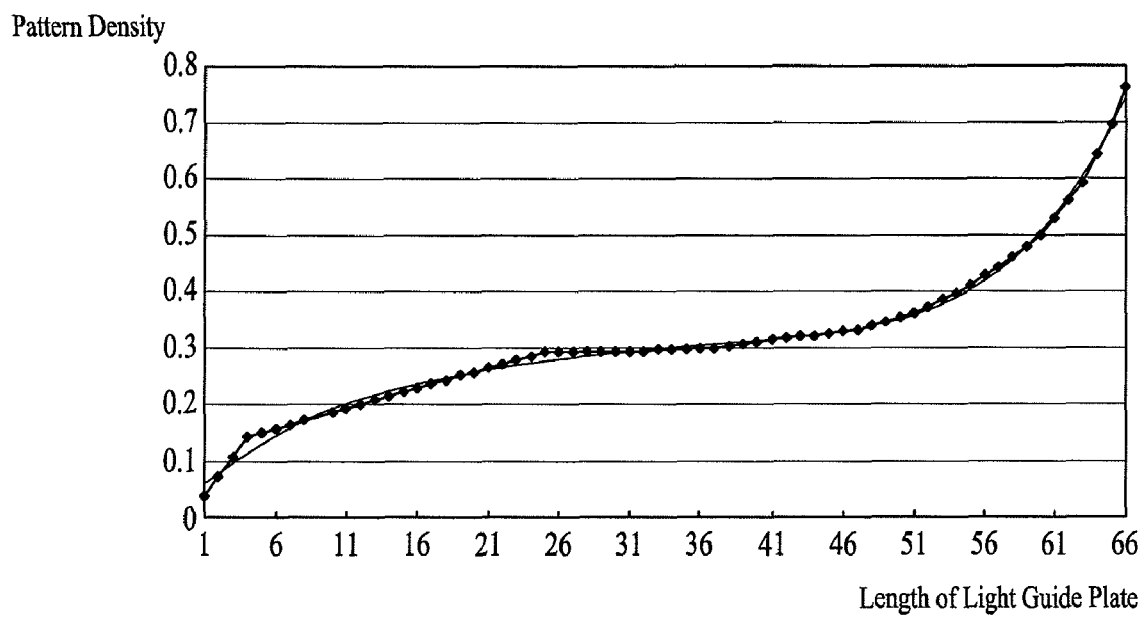
FIG. 5 is a graph depicting a density of patterns shown in FIG. 4.

The variation in the density of the patterns 500 shown in FIG. 4 are also depicted through a graph shown in FIG. 5. That is, when the density variation of the patterns 500 exhibited along the side surface 230 of the light guide plate 200 is expressed by a function, it may be depicted in the form of a curve shown in FIG. 5.

In more detail, FIG. 5 illustrates an example of a density variation of the patterns 500 capable of improving the uniformity of light emitted through the light emission surface 220. Referring to FIG. 5, it can be seen that the curve has an inflection point at a position spaced apart from a left side surface (from the side of the light incidence part 210) by a distance corresponding to about ⅔ of the lateral length of the light guide plate 200. That is, where the light guide plate 200 is divided into 2 or 3 equal parts in a light travel direction, the density-increased region where the density of patterns is gradually increased may be formed at the right part such that the density of patterns is gradually increased in the light travel direction.

For example, as shown in FIG. 4, the density-increased region where the density of patterns is gradually increased may be provided at a region on an upper surface portion 250 (or lower surface portion) near the second side surface 204. In an alternative example, the patterns may be formed at the upper surface portion 250 in the region 501 and on the lower surface 240 in other regions.

Figure 6:
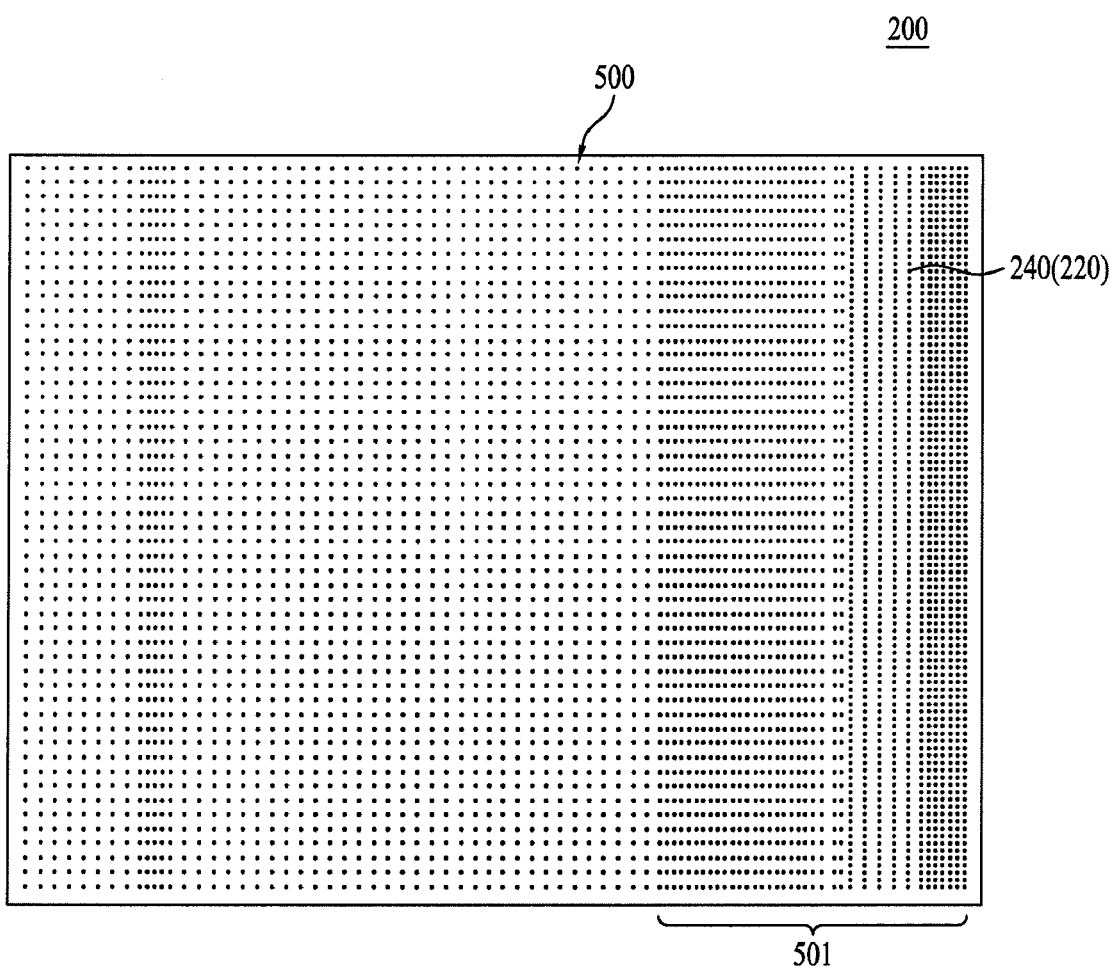
FIG. 6 is a bottom view illustrating a light guide plate having the patterns of FIG. 4.

Next, FIG. 6 illustrates the lower surface 240 of the light guide plate 220 formed with the patterns 500. As shown, FIG. 6 illustrates an example in which the patterns 500 are formed such that they have a density-increased region 501 where the density of the patterns 500 is gradually increased starting from a position where an inflection point is formed. As described above, the patterns 500 can also be applied to the light emission surface 220 of the light guide plate 200.

Figure 7:
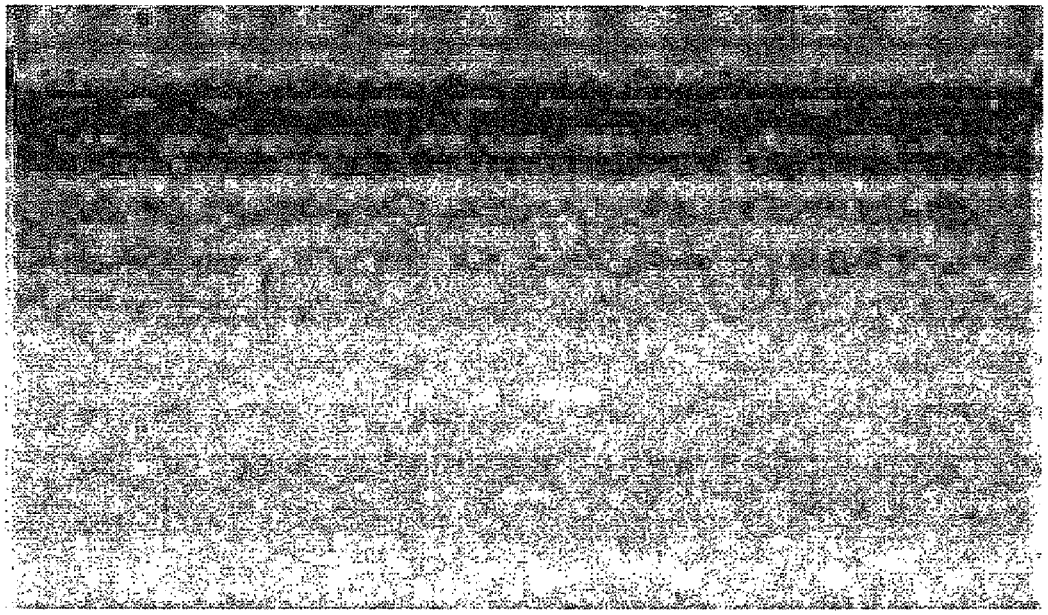
FIG. 7 is a simulation diagram illustrating a light distribution by the light guide plate having the patterns of FIG. 4.

FIG. 7 illustrates light extraction by the light guide plate 200 including the patterns 500 formed on the lower surface 240 of the light guide plate 200 with the density-increased region 501 at the side of the second side surface 204. As shown in FIG. 7, bright/black lines are formed at the side of the light incidence part (at an upper portion of FIG. 7) due to intersection of dark and bright portions, even though a relatively excellent light uniformity is exhibited at the side of the second side surface 204 in accordance with the density-increased region 501.

The bright/dark limes may be caused by the light distribution in the light guide plate 200 and a difference among reflection paths along full reflection surfaces in the light guide plate 200. Therefore, it is possible to reduce formation of bright/dark lines at the light extraction surface of the light guide plate 200, and thus to form a more uniform light extraction surface by forming patterns 500 capable of changing the above-described light distribution or reflection path difference, and varying the density of the patterns 500 in accordance with a position thereof on the light guide plate 200.

Figure 8:
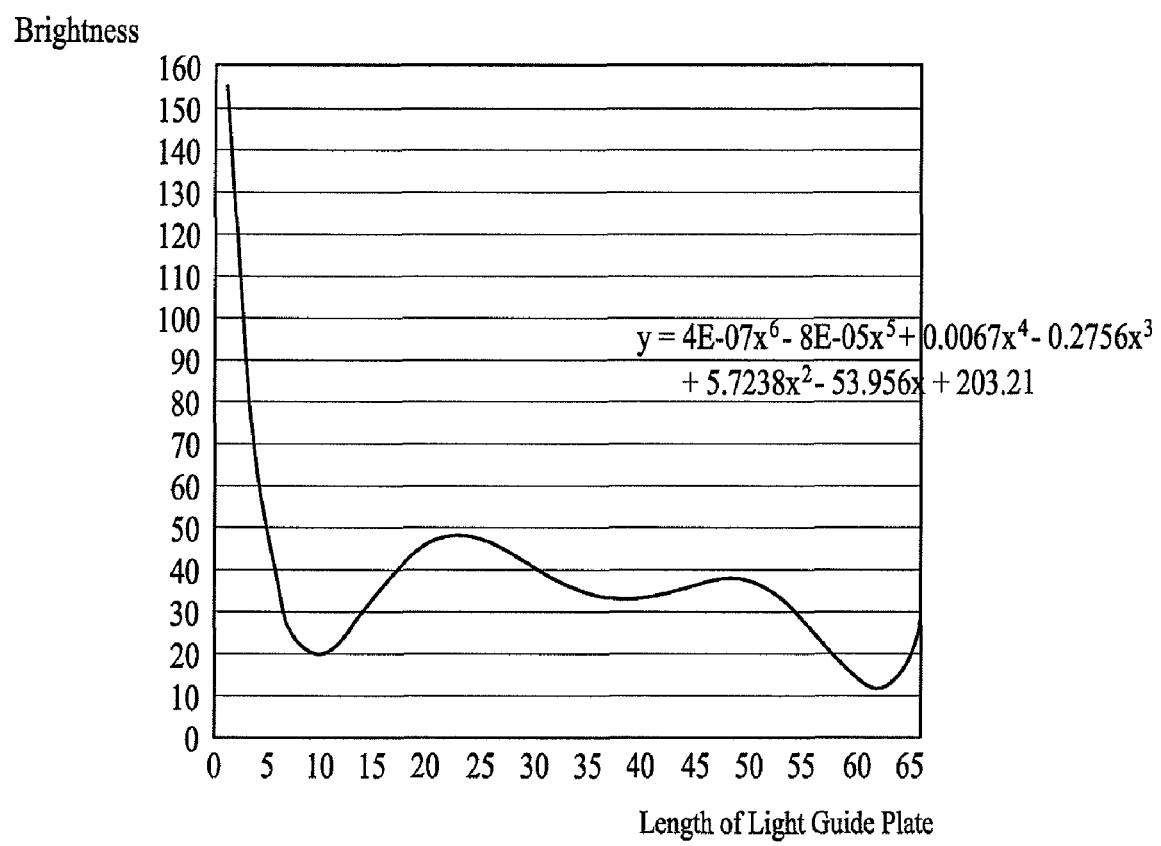
FIG. 8 is a graph depicting a brightness value per pattern.

Thus, through the variation in the density of the patterns 500, it is possible to reduce or eliminate such a bright/dark line formation, namely, a phenomenon that light irradiated from the light source unit 400 and then reflected by the lower reflection section of the light guide plate 200 form bright portions, which are shown in the form of bright lines, or dark portions are formed due to structures arranged between the adjacent light guide plates 200, thereby degrading the uniformity of the back-light unit. Further, the brightness of the light guide plates 200 can be analyzed based on the brightness value per pattern, as expressed by a formula according to the graph shown in FIG. 8.

Figure 9:
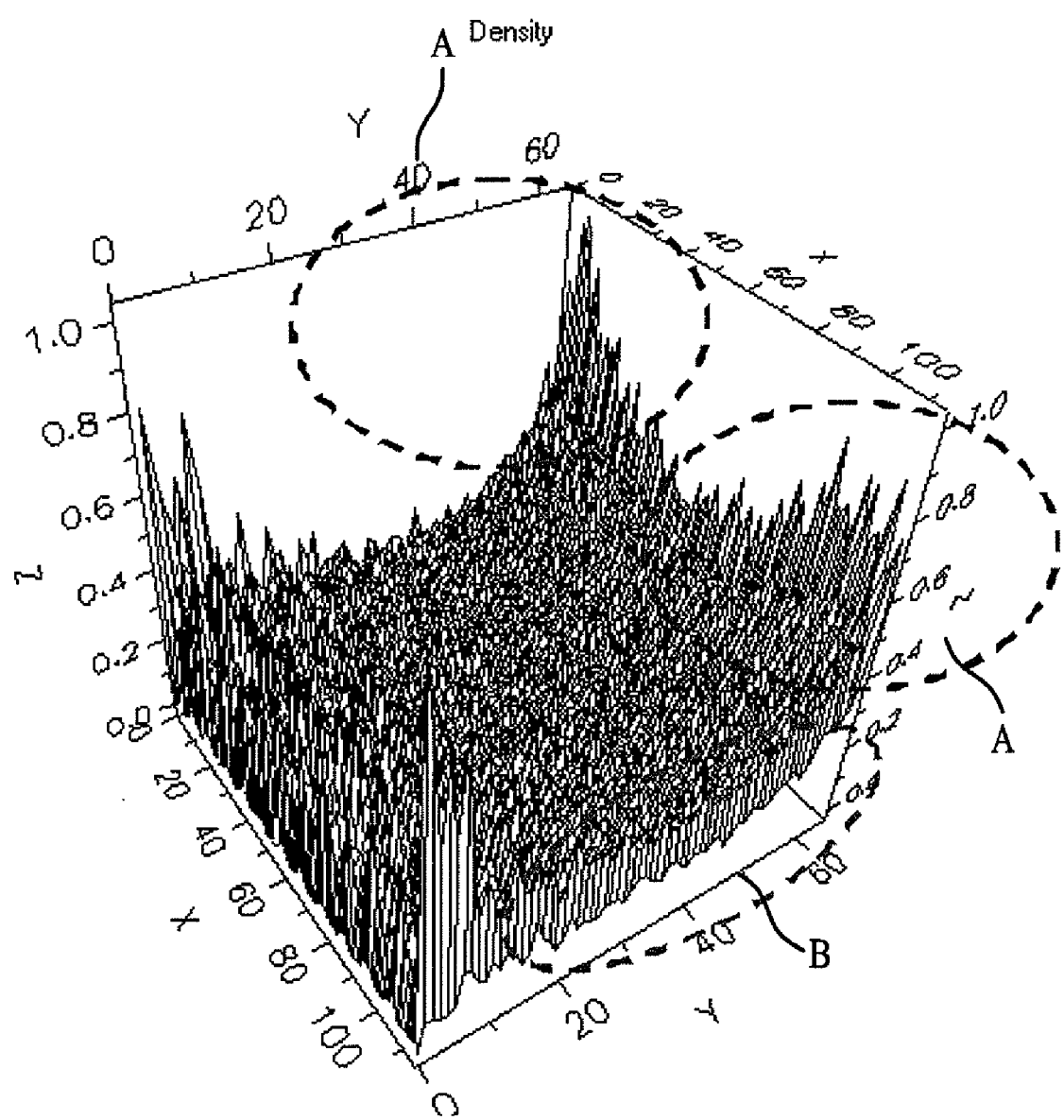
FIG. 9 is a graph spatially depicting a density variation of patterns for uniform light extraction.

In addition, FIG. 9 is a graph spatially depicting a density variation of the patterns 500 to achieve uniform light extraction. As shown, FIG. 9 illustrates regions where a density-increased region 501 for uniform light extraction is needed. In more detail, in the graph of FIG. 9, the X-axis direction represents an extension direction of the light incidence part 210 of the light guide plate 200, and the Y-axis direction represents an extension direction of the side surfaces extending from the light incidence part 210 to the second side surface 204 in the light guide plate 200.

In FIG. 9, a region exhibiting a high density, as in the region "A", may be a region requiring patterns 500 at an increased density. The region B represents a region where it is desirable to reduce the density of patterns 500. That is, the region where it is desirable to increase the density of patterns 500 corresponds to a low-brightness (dark) portion of the light emission surface 220, whereas the region where it is desirable to reduce the density of patterns 500 corresponds to a high-brightness (bright) portion of the light emission surface 220.

Figure 10:
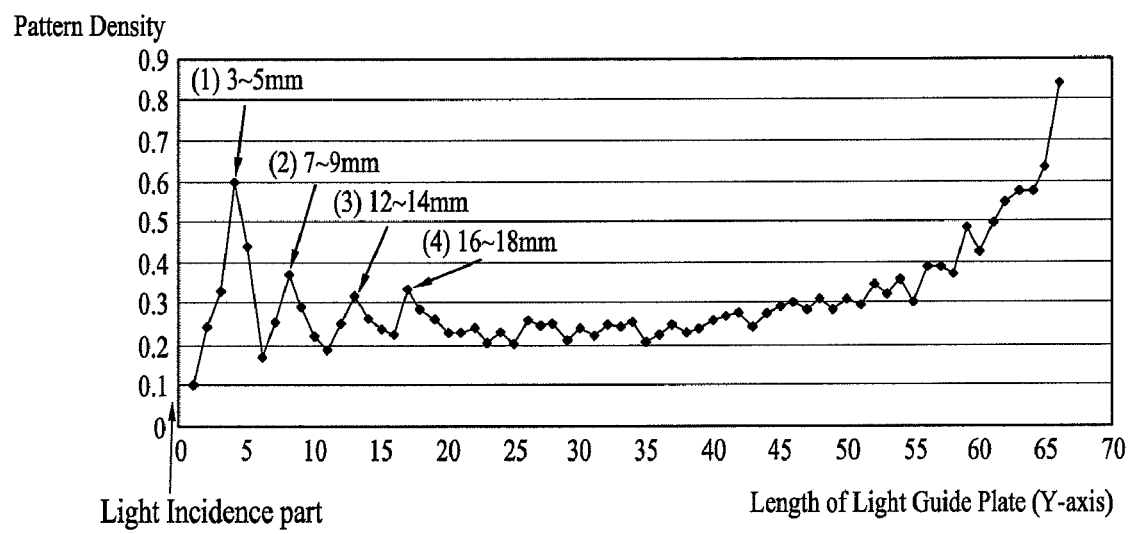
FIG. 10 is a graph depicting a Y-axis pattern curve corresponding to FIG. 8.

A density variation in the Y-axis direction may also be depicted in the form of a graph, as shown in FIG. 10. That is, FIG. 10 is a graph depicting a variation in the density of patterns formed on the light guide plate. Referring to FIG. 10, it can be seen that there are four dark regions (namely, regions requiring an increase in pattern-density) at the side of the light incidence part 210. It can also be seen that even in the side opposite to the light incidence part there is a dark region.

Thus, the density of patterns 500 can be varied to achieve uniform light extraction at the light emission surface 220, and it is possible to achieve an enhancement in uniformity when a local pattern-density increase is performed in the case of FIG. 10, at three regions if one of the third and fourth peculiar points in the graph of FIG. 10 is ignored, or at four regions if all the four peculiar points are applied.

It can also be seen in FIG. 10 that the light uniformity at the light emission surface 220 is further enhanced when the density of patterns 500 at the side opposite to the light incidence part 210 is gradually increased as the position of the patterns 500 is closer to the end opposite to the light incidence part 210. FIG. 10 also illustrates that the density of patterns 500 is substantially uniform in a region between the light incidence part 210 and the end opposite to the light incidence part 210.

Figure 11:
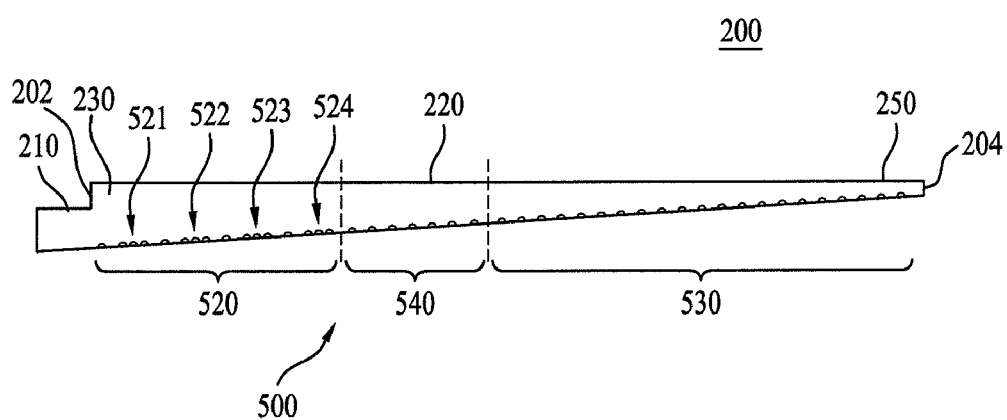
FIG. 11 is a sectional view of a light guide plate having patterns according to another embodiment of the present invention.

Next, an example of patterns 500 formed on the light guide plate 200 using the above-described conditions is illustrated in FIG. 11. In more detail, FIG. 11 is a sectional view illustrating a light guide plate 200 constituting the back-light unit according to an embodiment of the present invention.

As shown in the embodiment shown in FIG. 11, the patterns 500 include a first pattern section 520 having at least one line-shaped type density-reinforced region arranged in an area near the light incidence part 210. In the density-reinforced region, the density of the patterns 500 is locally increased. The patterns 500 also include a second pattern section 530 arranged in an area near the second side surface 204 opposite to the light incidence part 210 while having a pattern-density gradually increased toward the second side surface 204.

The first pattern section 520 also includes a plurality of band type density-reinforced regions 521, 522, 523 and 524. In addition, the patterns 500 include a third pattern section 540 arranged between the first pattern section 520 and the second pattern section 530 while having a substantially-constant pattern-density. As shown in FIG. 11, the band type density-reinforced regions 521, 522, 523 and 524 arranged at the first pattern section 520 are located at the same positions as respective peculiar points designated by "(1)" to "(4)" in FIG. 10 or at positions near respective peculiar points.

Thus, as shown in FIG. 11, the light-extracting surface patterns include a first region 520 of light-extracting surface patterns having a higher pattern-density than a second region 540 of surface patterns next to the first region 520, and the first region 520 of light-extracting surface patterns is closer to the light incident part 210 than the second region 540 of light-extracting surface patterns.

Further, the light-extracting surface patterns further include a third region 530 of light-extracting surface patterns having a higher pattern-density than the first region 520 of light-extracting surface patterns, and the second region 540 of light-extracting surface patterns is next to the first region 520 of light-extracting surface patterns, and the third region 530 of light-extracting surface patterns is next to the second region 540 of surface patterns.

Also, the pattern-density of the light-extracting surface patterns in the second and third regions 540 and 530 can both include gradually increasing density of patterns (FIG. 11 illustrates the second region 540 having a uniform or constant density).

Figure 12:
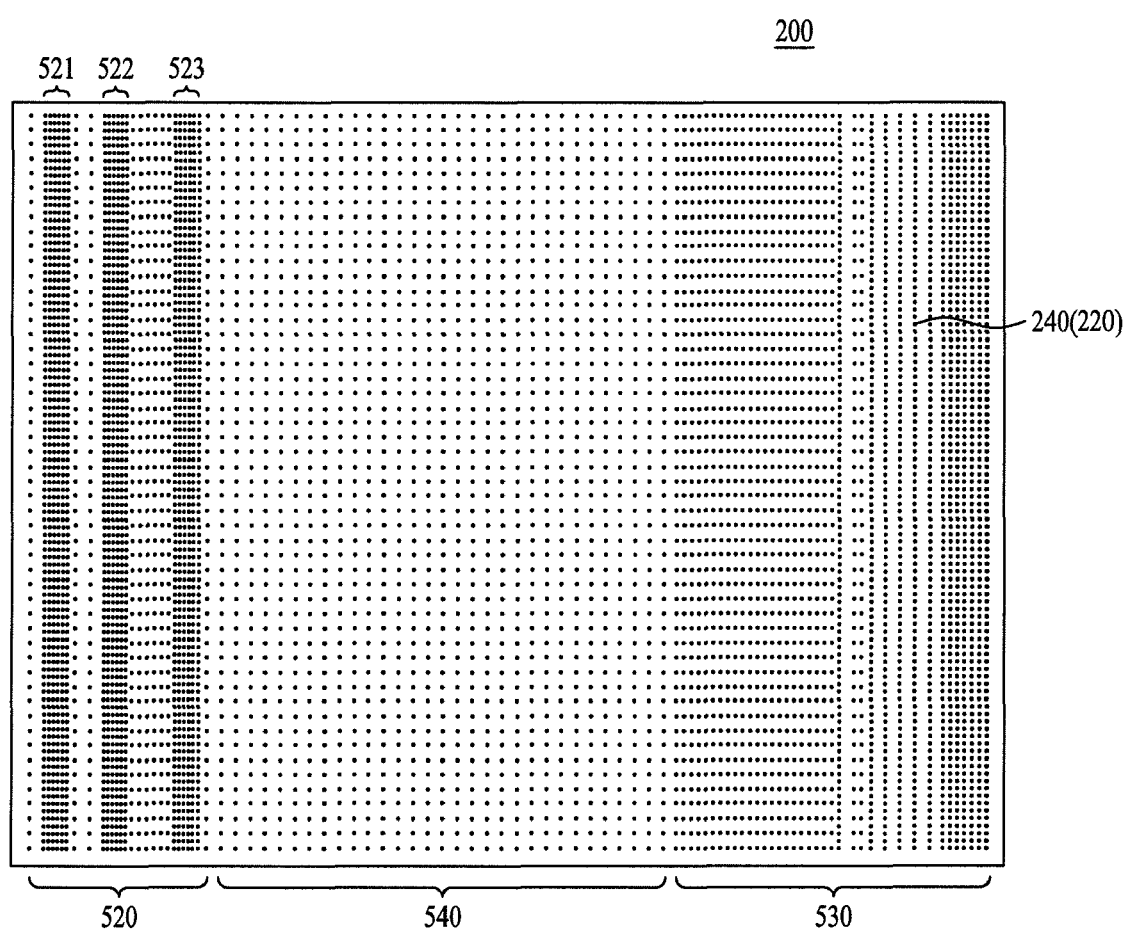
FIG. 12 is a bottom view of a light guide plate having patterns according to yet another embodiment of the present invention.

FIG. 12 illustrates another example of patterns 500 formed on the lower surface of 240 of the light guide plate 200. In more detail, the patterns 500 of FIG. 12 are similar to the patterns 500 of FIG. 11 in that the patterns 500 of FIG. 12 include a first pattern section 520 having three band type density-reinforced regions 521, 522 and 523, a second pattern section 530, and a third pattern section 540.

As described above, the patterns 500 may also be formed on the upper surface of the light guide plate 200, namely, the light emission surface 220. Further, the first pattern section 520, which includes at least one band type density-reinforced region as described above, may be provided in at least two areas near the first side surface 202. Also, where the first pattern section 520 includes a plurality of band type density-reinforced regions, these regions may be arranged in parallel to the arrangement direction of the LEDs.

Thus, as shown in FIG. 12, a top-view shape of the light-scattering surface forms at least one of a line-shape and a band-shape. In particular, the first region 520 of light-extracting surface patterns includes a plurality of band-shaped high density patterns 521, 522 and 523 separated from one another. In addition, the first region 520 of light-extracting surface patterns includes a plurality of line-shaped patterns disposed between the plurality of band-shaped high density patterns 521, 522 and 523.

Therefore, according to embodiments of the present invention, it is possible to considerably improve the uniformity of light at the light extraction surface of the back-light unit by applying light extraction patterns having a pattern-density relatively increased at dark portions of the light emission surface of the light guide plate while being relatively reduced at bright portions of the light emission surface. The uniformity improvement can also be maximized when the light guide unit or back-light unit is used as a unit block to constitute a large-size light guide unit or back-light unit.

Figure 13:
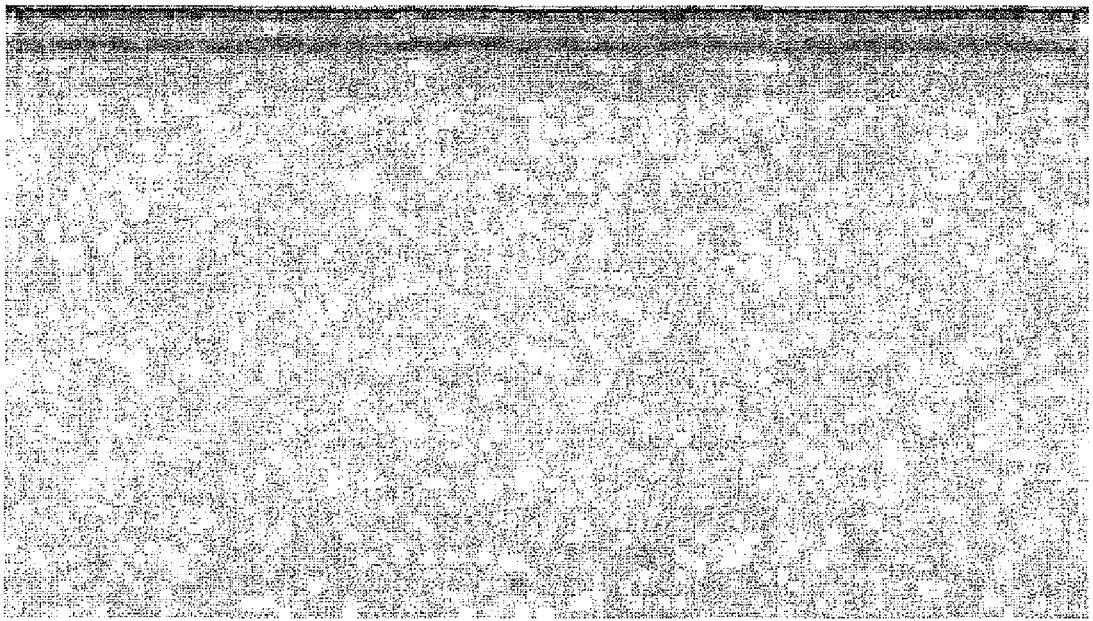
FIG. 13 is a simulation diagram illustrating a light distribution by the light guide plate having the patterns of FIG. 10.

Next, FIG. 13 illustrates light extraction by the light guide plate 200 in which the patterns 500 including the first pattern section 520, second pattern section 530, and third pattern section 540 are formed on the lower surface 240 of the light guide plate 200 at the side of the second side surface 204. As shown in FIG. 13, the uniformity of light at the light incidence part is significantly improved.

Figure 14:
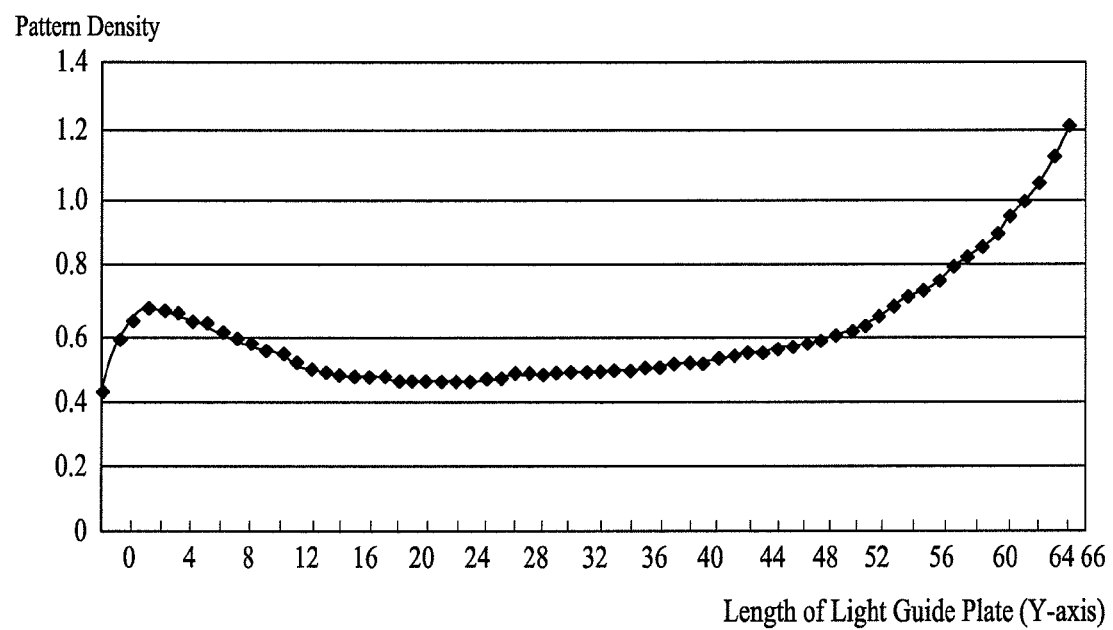
FIG. 14 is a graph depicting a density of the patterns formed on the light guide plate according to an embodiment of the present invention.

FIG. 14 is yet another graph depicting the density of patterns formed on the light guide plate. As shown in the graph of FIG. 14, when the light guide plate 200 is divided into 2 or 3 equal parts in a direction from the first side surface to the second side surface, a density-increased region where the density of patterns is gradually increased can be formed on the lower or upper surface of the light guide plate 200 at the rightmost part. The density-increased region can also be provided at the upper surface of the light guide plate 200, namely, the light emission part 220, in place of the lower surface of the light guide plate 200.

Also, when the light guide plate 200 is divided into 2 or 3 equal parts in a direction from the first side surface to the second side surface, a density-increased/decreased region where the density of patterns is gradually increased and then gradually decreased can be formed on the lower or upper surface of the light guide plate at the left part.

In addition, the density-increased/decreased region is an example of a density-reinforced region having a higher pattern-density than other regions around the density-reinforced region. This density-reinforced region will hereinafter be referred to as a "density-increased/decreased region" to distinguish this region from a region having a gradually-increased pattern-density and a region having a gradually-decreased pattern-density.

The density-increased/decreased region can also be arranged near the light incidence part, and can have a pattern-density gradually increased and then gradually decreased in a direction from the first side surface 202 to the second side surface 204. That is, the density of the light extraction patterns in this instance may be expressed in the form of a curve function of degree 2 or more to a distance from one side of the light emission part 220 in a direction toward the other side of the light emission part 220. The curve function may also have at least 2 inflection points.

In addition, in the embodiment of FIG. 14, the density of patterns provided at the light guide plate 200 substantially has the form of a cubic function. Further, an improvement in light uniformity is exhibited because the density-increased/decreased region is arranged on the upper or lower surface of the light guide plate 200 at the side of the light incidence part 210.

The patterns in the density-increased/decreased region can also have a density gradually varied without being constant. That is, although a region having a higher density than other regions around the region is macroscopically exhibited in the form of a band, the density of patterns in this high-density region can be gradually varied without being constant. Similarly, in the embodiment of FIG. 14, the highest-density portion of the density increased/decreased region can be arranged in an area spaced apart from the first side surface 202 by a distance range corresponding to about 3 to 6% of the length (e.g., 66 mm) of the light guide plate 200 from the first side surface 202 to the second side surface 204.

That is, the pattern-density in the region spaced apart from the first side 202 by a distance range corresponding to about 3 to 6% of the length (e.g., 66 mm) of the light guide plate 200 from the first side surface 202 to the second side surface 204 exhibits an aspect of gradual variation.

Referring to FIG. 14, it can also be seen that the light uniformity at the light emission surface is further enhanced when the density of patterns 500 at the side opposite to the light incidence part 210 is gradually increased as the position of the patterns 500 is closer to the end opposite to the light incidence part 210. FIG. 14 also illustrates that the density of patterns 500 is substantially uniform in a region between the light incidence part 210 and the end opposite to the light incidence part 210.

Thus, as shown in FIG. 14, the light-extracting surface patterns include a first region (e.g., 0 to 16 length) of light-extracting surface patterns having a higher pattern-density than a second region (e.g., 16 to 48 length) of surface patterns next to the first region, and the first region of light-extracting surface patterns is closer to the light incident part 210 than the second region of light-extracting surface patterns. In addition, the light-extracting surface patterns further include a third region (e.g., 48 to 66 length) of light-extracting surface patterns having a higher pattern-density than the first region of light-extracting surface patterns. Also, the second region of light-extracting surface patterns is next to the first region of light-extracting surface patterns and the third region of light-extracting surface patterns is next to the second region of surface patterns.

In addition, as shown in FIG. 14, the pattern-density of the light-extracting surface patterns in the first region has a first portion of an increasing density of patterns, and a second portion of a gradually decreasing density of patterns after the first portion of the gradually increasing density of patterns. Further, the pattern-density of the light-extracting surface patterns in the second and third regions include gradually increasing density of patterns.

Thus, it is possible to compensate for the brightness at the upper surface of the light guide plate 200 by increasing the density of the patterns as the distance of the patterns from the light sources, namely, the LEDs 420, increases. It is also possible to achieve brightness uniformity by providing the band type density-reinforced region even on the lower surface of the light guide plate at the left part.

Different from the embodiment shown in FIG. 10, a density-increased/decreased region, which is different from the band type density-reinforced region, can be provided in accordance with the characteristics of the light guide plate, as illustrated in the pattern-density graph shown in FIG. 14. In addition, because the light emission rate may be varied depending on the thickness, size or material of the light guide plate, the patterns may be appropriately designed in accordance with these parameters. Thus, the amount of light can be reinforced by forming a band type density-reinforced region or a density-reinforced region having a gradually-varied pattern-density, in accordance with the kind, shape or size of the light guide plate.

Further, although FIG. 14 illustrates the patterns including both the density-increased region where the pattern-density is gradually increased and the density-increased/decreased region where the pattern-density is gradually increased and then gradually reduced, the patterns may include only one of the density-increased region and density-increased/decreased region. Thus, the patterns may include both the density-increased/decreased region where the pattern-density is increased and then decreased as the light guide plate extends in a direction from the first side surface to the second side surface, and the density-increased region where the pattern-density is gradually increased.

As shown in FIG. 14, the highest pattern-density in the density-increased/decreased region may be lower than the highest pattern-density in the density-increased region. That is, the pattern-density in the density-increased region may be designed to be higher than a pattern-density to compensate for the amount of light in the density-increased/decreased region where the light emission rate may be abnormally reduced, because the light guide plate has a gradually-reduced thickness, and the distance of the light guide plate from the LEDs is increased as the light guide plate extends.

Further, a portion of the density increased/decreased region where the highest pattern-density in the density-increased/decreased region is exhibited can be arranged in an area spaced apart from a distance range corresponding to 3 to 10% of the length of the light guide plate from the first side surface to the second side surface.

Figure 15:
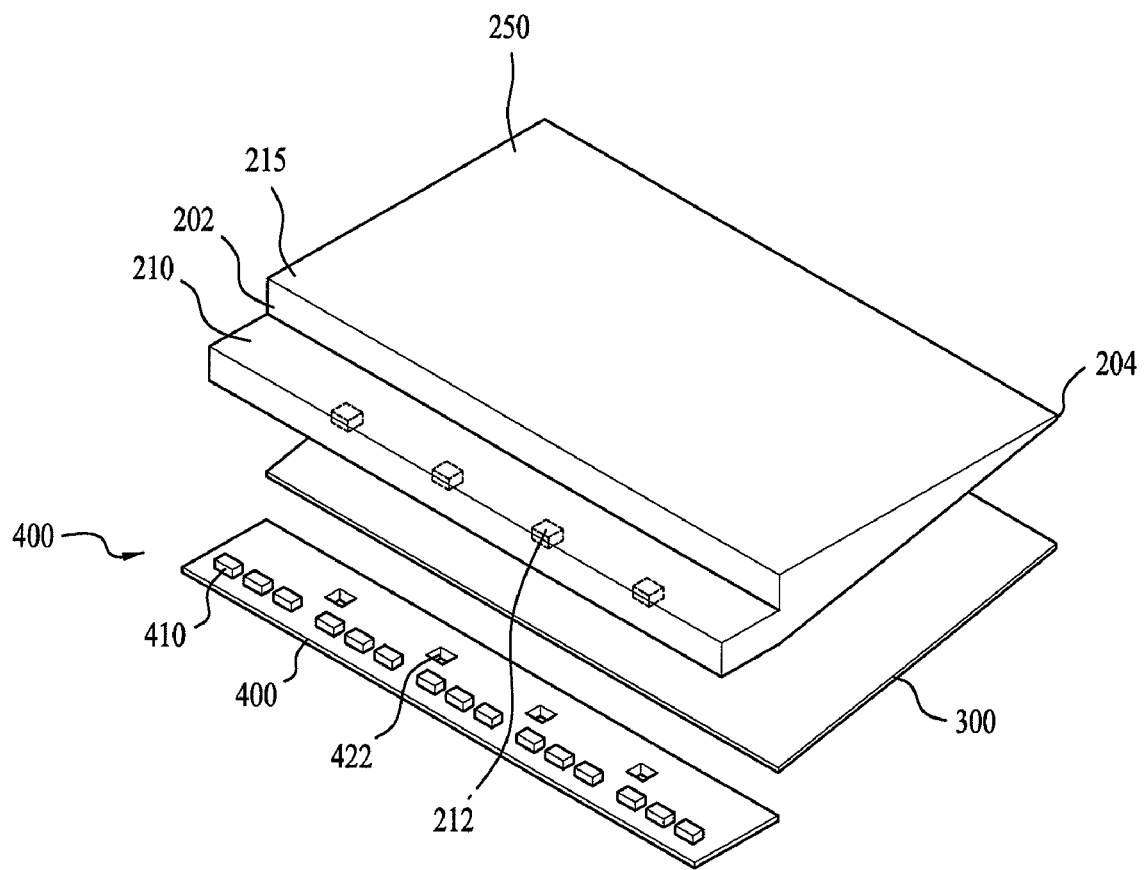
FIG. 15 is an exploded perspective view illustrating a back-light unit according to an embodiment of the present invention.

Next, FIG. 15 is an exploded perspective view illustrating a back-light unit according to an embodiment of the present invention. In the embodiment shown in FIG. 15, the light guide plate 200 has a thickness gradually reduced as it extends from the first side surface 202 to the second side surface 204. A plurality of LEDs 410 are also arranged at the side of the light incidence part 210 of the light guide plate 200 in a state of being mounted to the substrate 420 while being uniformly spaced apart from one another by a predetermined spacing.

A plurality of insert grooves 422 are also provided at the substrate 420 to receive insert protrusions for position determination to determine the positions of the light guide plate 200 and substrate 410 when the light guide plate 200 and substrate 410 are coupled to each other, or for coupling reinforcement to reinforce the coupling of the light guide plate 200 and substrate 410.

Figure 16:
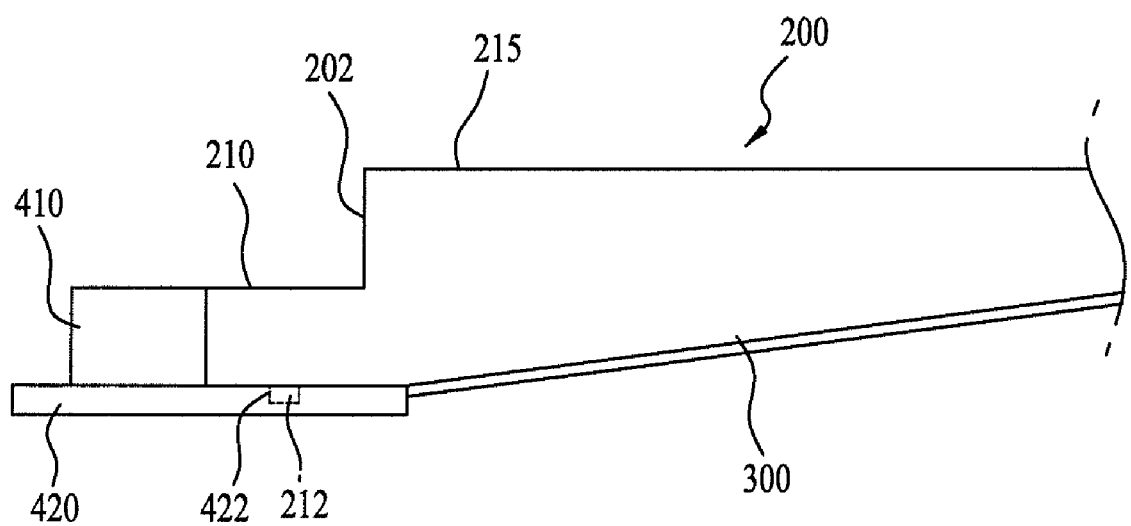
FIG. 16 is a sectional view illustrating a light guide plate, a reflection plate, and a light source unit shown in FIG. 15.

Next, FIG. 16 is a sectional view illustrating the light guide plate 200, reflection plate 300, and light source unit 400 shown in FIG. 15. As shown, plural protrusions 214, which are inserted into respective insert grooves 422, are provided at the lower surface of the light incidence part 210 of the light guide plate 200 and are spaced apart from one another.

Accordingly, when the light source unit 400 and light guide plate 200 are coupled to each other, the insert protrusions 214 of the light guide plate 200 are inserted into the insert grooves 422 of the substrate 420 so that the coupling positions of the light source unit 400 and light guide plate 200 may be determined. This configuration also assists the light source unit 400 and light guide plate 200 in maintaining their original positions against external impact.

Thus, it is possible to determine the positions of the light source unit 400 and light guide plate 200, and to prevent the light source unit 400 and light guide plate 200 from being separated from each other in accordance with the provision of the insert protrusions 214 and insert grooves 422. In addition, when the LEDs 410 are arranged at positions corresponding to respective insert protrusions 214 of the light guide plate 200, the travel of light may be cut off by the insert protrusions 212, or abnormal focusing may occur, thereby degrading the uniformity of brightness distribution.

Further, as shown in FIG. 16, the LEDs 410 are not mounted at positions corresponding to respective insertion protrusions 214. In this instance, however, the spacing of the LEDs 410 may be undesirably increased at the positions where there is no LED. As a result, the above-described coupling structure or the LED spacing may affect the brightness of light emitted from the light guide plate extending from the light incidence part. In order to eliminate or reduce non-uniformity of light brightness caused by the above-described incidental coupling structure or LED spacing, a method for forming patterns on the light emission surface or lower surface of the light guide plate 200 may be used.

Figure 17:
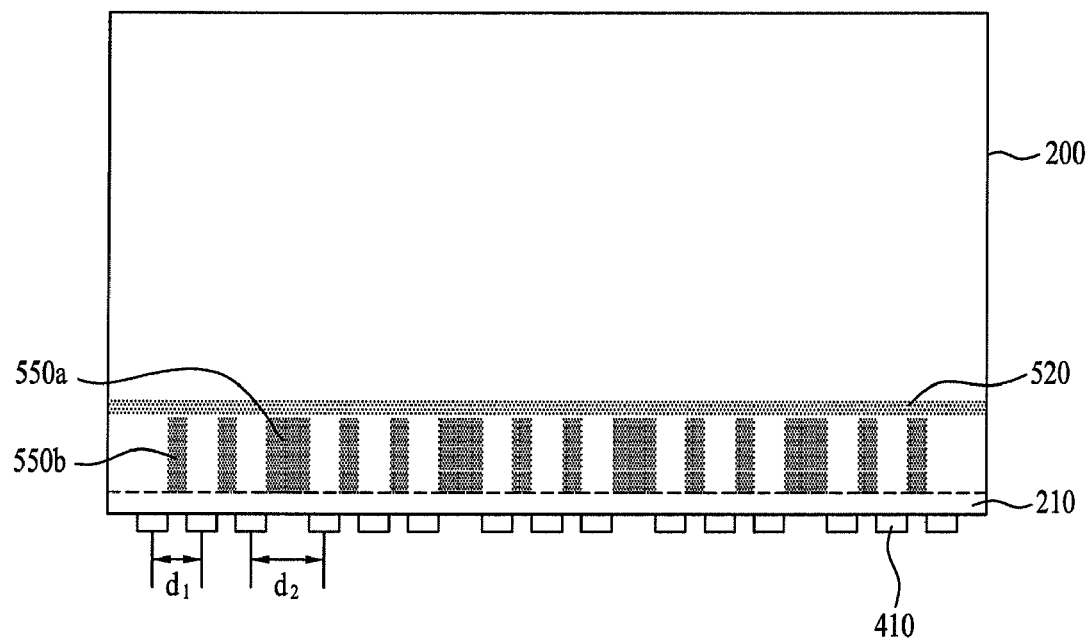
FIG. 17 is a plan view illustrating a light guide plate according to another embodiment of the present invention.

Next, FIG. 17 is a plan view illustrating the lower surface of the light guide plate 200 according to an embodiment of the present invention. As described above, the LEDs 410 mounted to the substrate 420 may be arranged such that they are spaced apart from one another by a predetermined spacing. As shown in FIG. 17, the LEDs 410 normally have a first spacing d1, and have a second spacing d2 (d2>d1) in regions corresponding to respective insert protrusions 214 in order to minimize interference by the insert protrusions 214.

Although the spacing of the LEDs 410 has been described and illustrated as being affected by the above-described insert protrusions or insert grooves in the description given in conjunction with FIGS. 15 to 17, it is possible to minimize a deviation in light brightness using a method, which will be described later, even when it is determined that the LED spacing is irregular due to factors other than the insert protrusions or insert grooves.

In addition, when the LED spacing is irregular, the brightness of light emitted from the light guide plate 200 may be low in a region corresponding to an inter-LED space having a longer LED spacing. Thus, in accordance with an embodiment of the present invention as shown in FIG. 17, a plurality of space-side density-reinforced regions 550a and 550b are formed at the lower surface of the light incidence part 210 of the light guide plate 200.

In more detail, the LEDs 410 are arranged such that they are irregularly spaced apart from one another in a longitudinal direction of the side surface of the light incidence part 210 by a predetermined spacing. A plurality of space-side density-reinforced regions 550a and 550b are formed on the upper or lower surface of the light guide plate 200 near the first side surface such that they correspond to spaces each defined between adjacent ones of the LEDs, namely, inter-LED spaces.

The plural space-side density-reinforced regions 550a and 550b are also arranged on the lower surface or light emission surface of the light guide plate 200 at regions corresponding to respective inter-LED spaces while being spaced apart from one another. That is, the patterns 550 are formed on the lower surface of the light guide plate 200 at regions corresponding to respective insert protrusions 214, because these regions may be darkened when they have no pattern. In addition, irrespective of the affect of the insert protrusions, the space-side density-reinforced regions may be formed where the LED spacing is irregularly increased.

Figure 18:
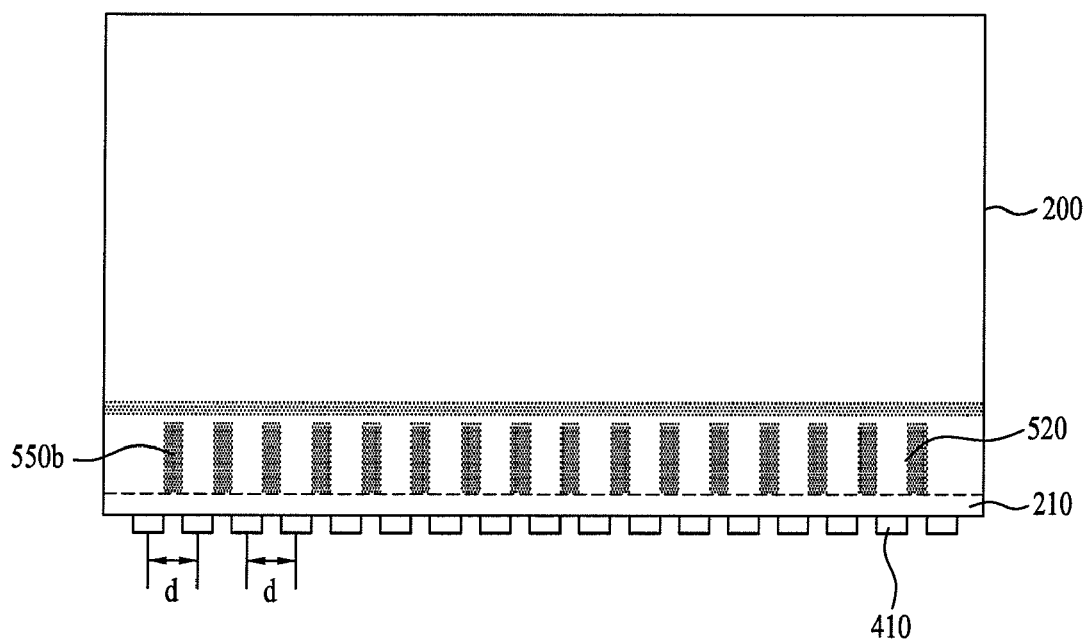
FIG. 18 is a plan view illustrating a light guide plate according to yet another embodiment of the present invention.

Further, FIG. 17 illustrates the spacing of the LEDs 410 being irregular. On the contrary, FIG. 18 illustrates the spacing of the LEDs 410 being regular. In addition, FIG. 17 illustrates a plurality of space-side density-reinforced regions 550a and 550b formed at regions corresponding to respective inter-LED spaces such that particular ones of the space-side density-reinforced regions 550a and 550b, namely, the space-side density-reinforced regions 550b have an area larger than the remaining space-side density-reinforced regions, namely, the space-side density-reinforced regions 550a. Also, FIG. 18 illustrates a plurality of space-side density-reinforced regions 550a formed at regions corresponding to respective inter-LED spaces such that the spacing d of the LEDs 410 is constant, and the space-side density-reinforced regions have the same area. The area or pattern-density of each space-side density-reinforced region can also be proportional to the LED spacing.

In more detail, the spacing of the LEDs 410 arranged adjacent to the light guide plate 200 in FIG. 17 include two spacings d1 and d2 having a relation of d1<d2. Thus, it is possible to achieve an improvement in light uniformity by forming patterns such that the area or pattern-density of each space-side density-reinforced region is proportional to the spacing d of the LEDs 410.

As described above, the band type density-reinforced region is also formed at a position near the first side surface. The space-side density-reinforced regions may extend to the band type density-reinforced region. In this instance, the band type density-reinforced region 520 and space-side density-reinforced regions 550 form a plurality of repeated rectangular shapes.

Figure 19:
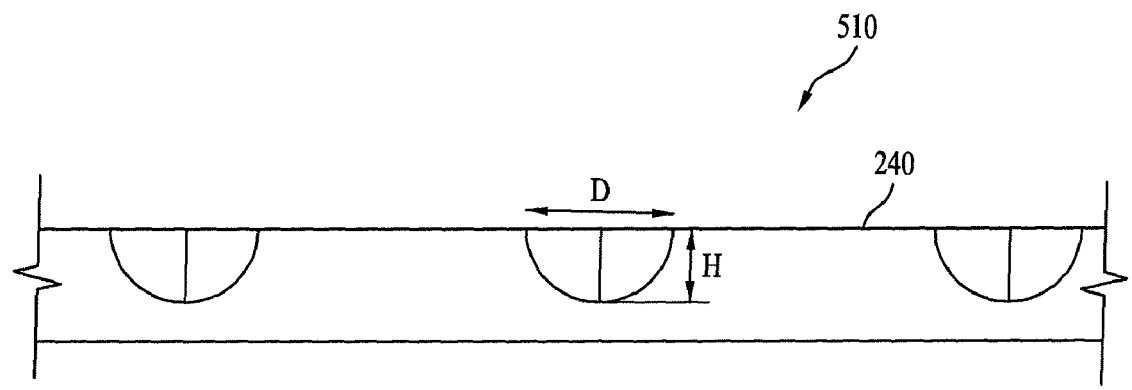
FIG. 19 is a schematic view illustrating a structure and condition of a unit pattern according to an embodiment of the present invention.

Next, FIG. 19 illustrates the patterns 500 having a spherical unit pattern structure 510. Also, with this pattern structure, it is preferable that the ratio of the diameter D to the depth H in the unit pattern structure be set to about 0.3 to 1. That is, when the spherical concave pattern structure 510 is used, the structure is preferably shaped such that the diameter D is larger than or equal to the depth H. In addition, as shown in FIGS. 17 to 22, various shapes may be used as the unit pattern structure of the patterns 500.

Figure 20:
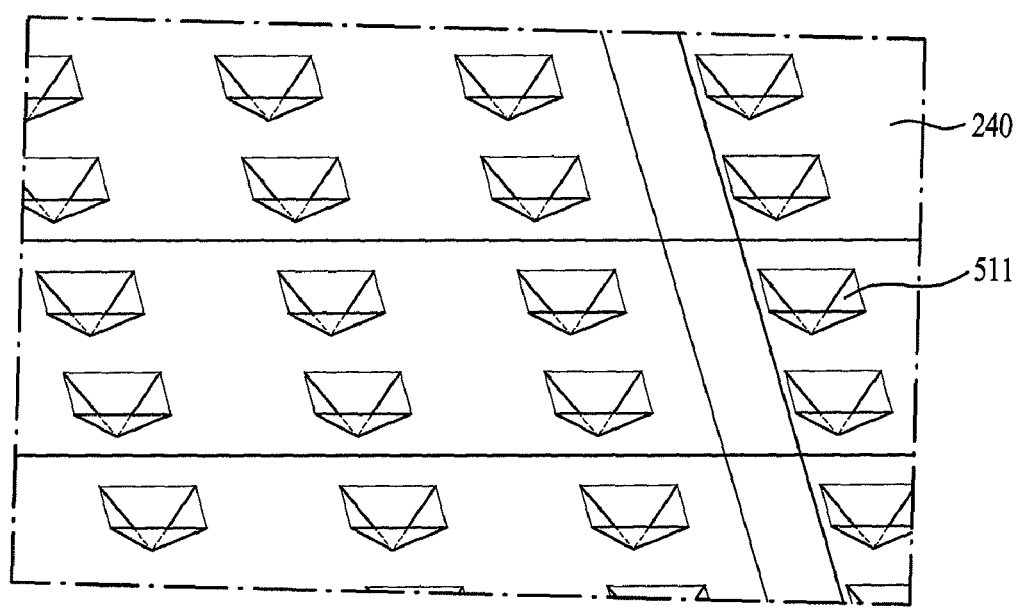
FIGS. 20 to 24 are schematic views illustrating various shapes of unit patterns according to embodiments of the present invention.
Figure 21:
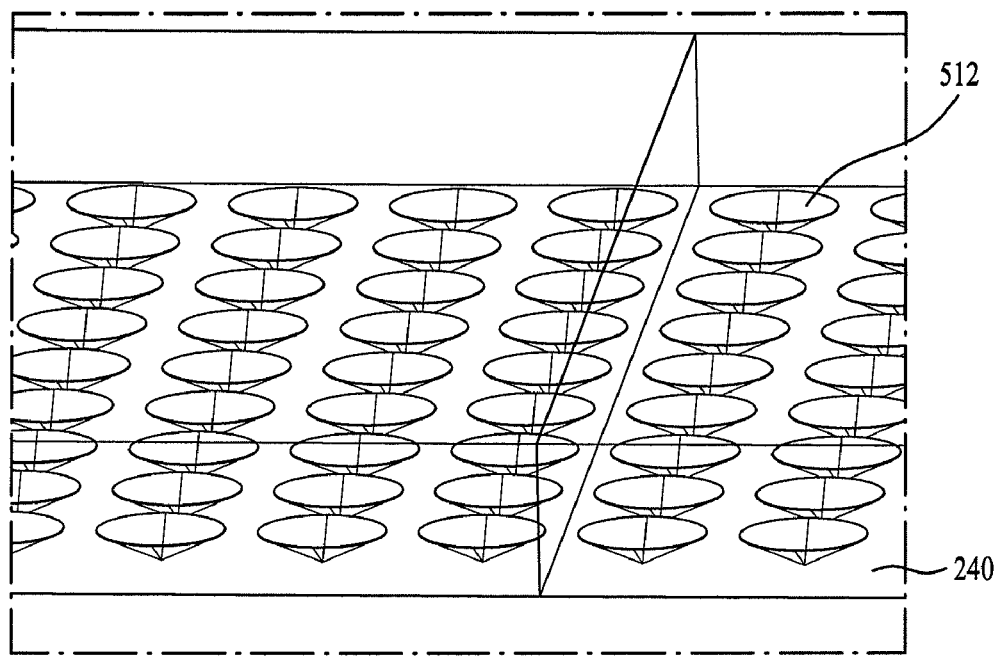
Figure 22:
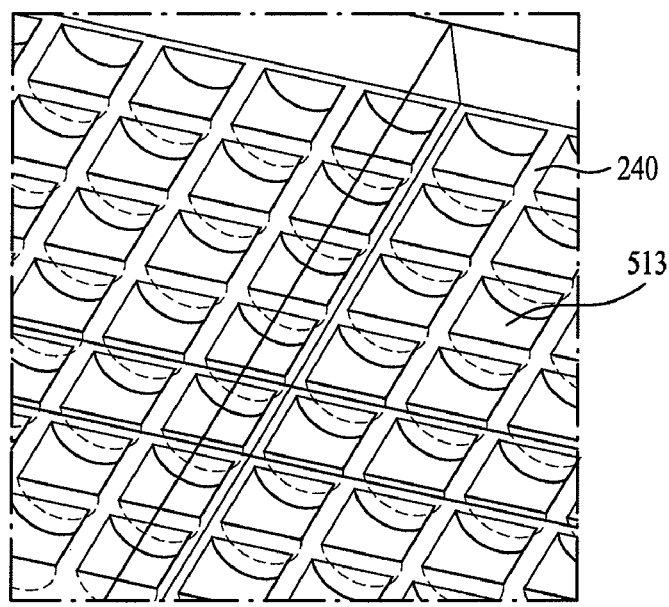
Figure 23:
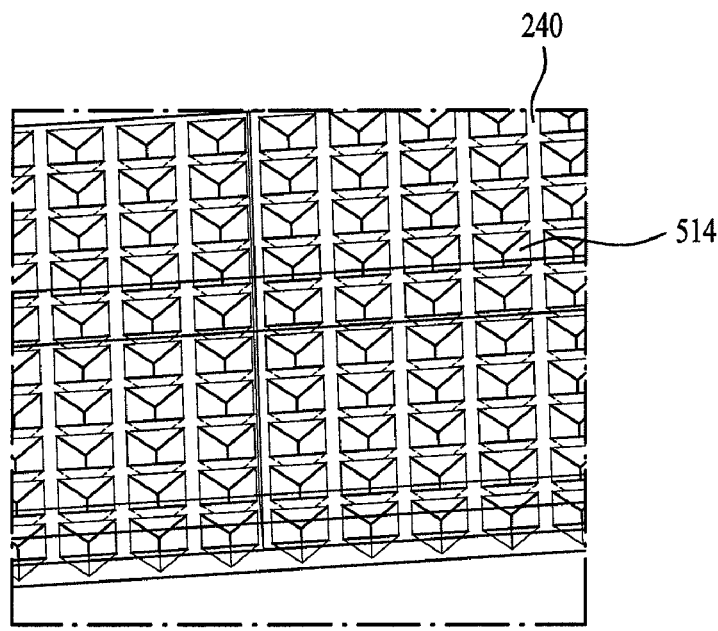

For example, FIG. 20 illustrates patterns having a pyramidal unit pattern structure 511, FIG. 21 illustrates patterns having a conical unit pattern structure 512, FIG. 22 illustrates patterns having a cylindrical unit pattern structure 513, FIG. 23 illustrates patterns having a prismatic unit pattern structure 514, and FIG. 24 illustrates patterns having an oval unit pattern structure 515. Also, patterns having a bur unit pattern structure may be used.

Thus, the patterns can have at least one of the dot structure, pyramidal structure, conical structure, cylindrical structure, prismatic structure, oval structure, and bur structure. The patterns can also include equally-spaced patterns or semi-random patterns which are not overlapped with one another while having a constant average inter-pattern spacing.

Figure 25:
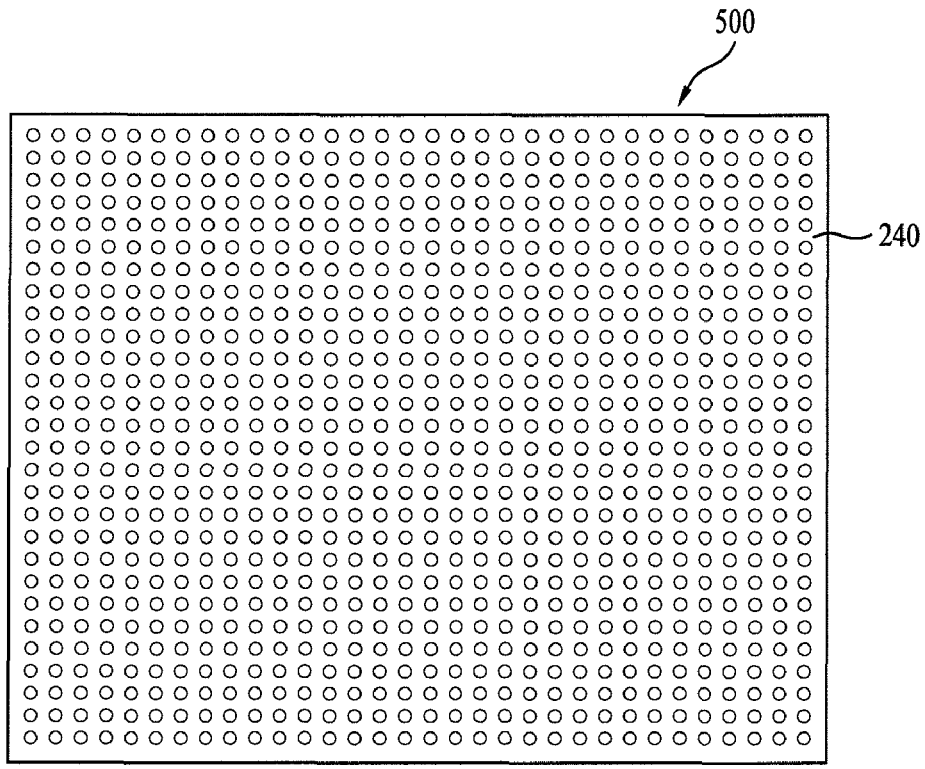
FIG. 25 is a schematic view illustrating equally-spaced patterns according to an embodiment of the present invention.
Figure 26:
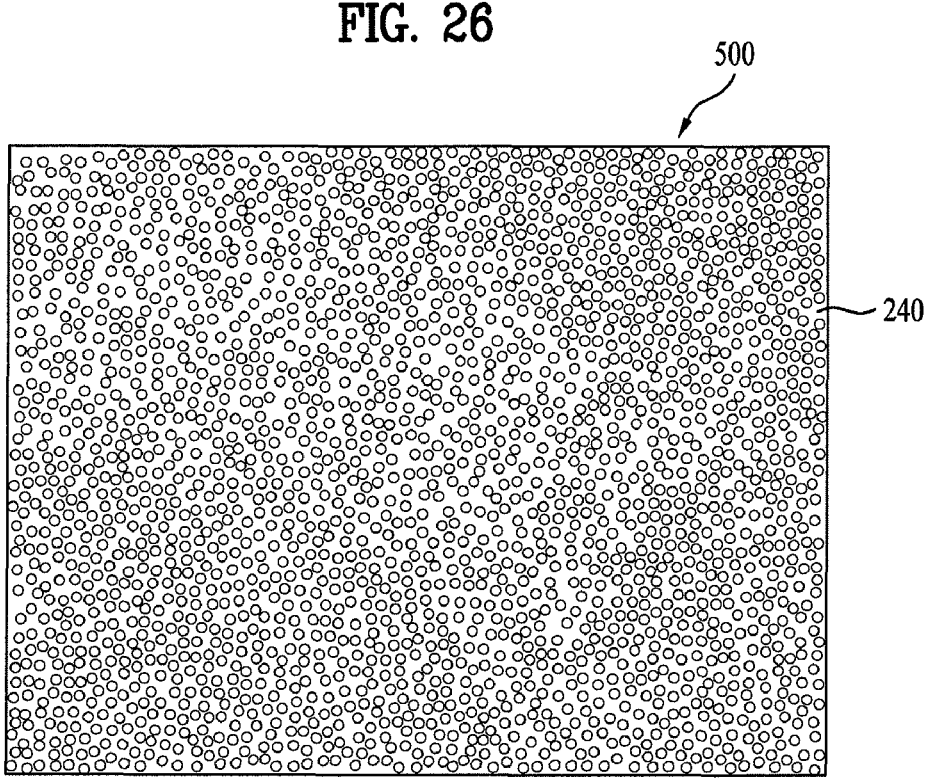
FIG. 26 is a schematic view illustrating semi-random patterns according to an embodiment of the present invention.

In more detail, for the patterns 500, equally-spaced patterns may be used. The equally-spaced patterns are spaced apart from one another by a constant spacing, in regions except for boundary points where a variation in pattern-density occurs, as shown in FIG. 25. Also, as shown in FIG. 26, for the patterns 500, semi-random patterns may be used. In this instance, the semi-random patterns are randomly arranged under a particular condition.

In addition, the semi-random patterns correspond to patterns randomly arranged under the condition in which the unit pattern structures are not overlapped with one another, and the average spacing between unit pattern structures is constant. Also, the interval of the equally-spaced patterns or the average spacing of the semi-random patterns may be 20 µm to 3 mm. The diameter of the unit pattern structure may also be 20 to 100 µm, and the depth of the unit pattern structure may be less than 50 µm.

Such unit pattern structures can also be formed using a core machine using a laser in accordance with an injection molding method. The unit pattern structures can also be formed using an extruding, direct laser machining, or printing method.

Figure 27:
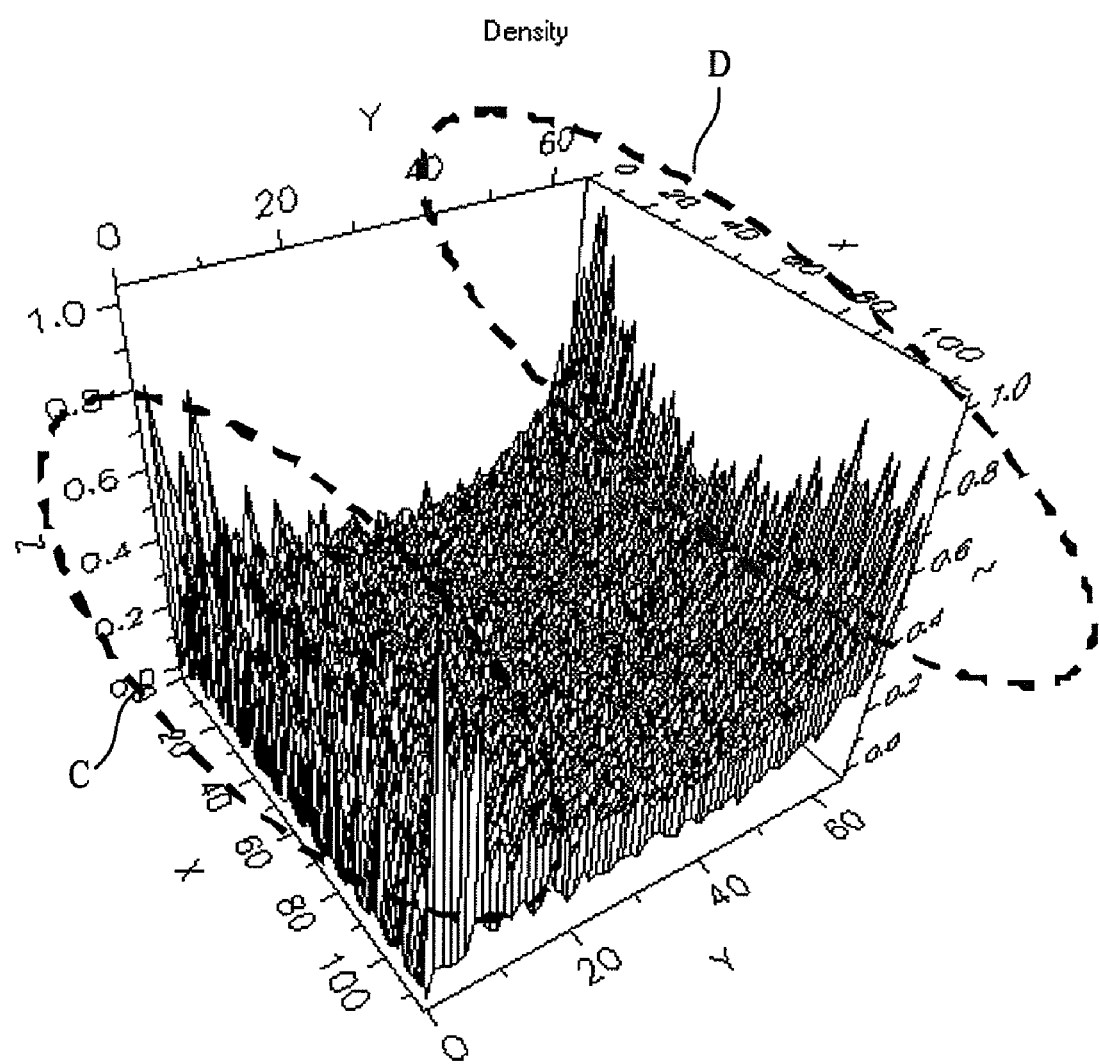
FIG. 27 is a graph spatially depicting a density variation of patterns for uniform light extraction according to an embodiment of the present invention.

Next, FIG. 27 is a graph similar to FIG. 9, spatially depicting a variation in the density of patterns 500 for uniform light extraction. To improve the uniformity of light extraction, a region at the side of the light incidence part 210 of the light guide plate 200 (region "C") and an upper region at the side opposite to the light incidence part 210 (region "D") in an X-axis direction of the graph are taken into consideration.

Further, the opposite ends of an upper portion of the region "C" at the side of the light incidence part 210 of the light guide plate 200 are regions where bright lines may be formed. Accordingly, one embodiment of the present invention improves the uniformity of light by reducing the density of patterns at these regions. One reason for the formation of such bright lines is that the light incidence part 210 is positioned near the light source unit 400, and light reflected from the rims 310 of the reflection plate 300 are relatively concentrated on the light guide plate 200.

Figure 28:
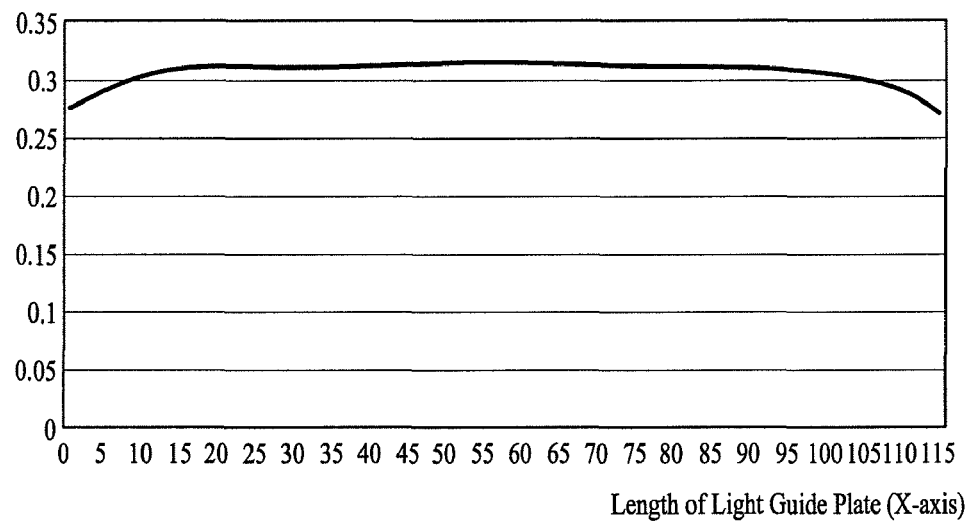
FIG. 28 is a graph depicting a pattern-density variation at a region "C" of FIG. 21.

Thus, the pattern-density at the opposite ends of the light incidence part 210 by 5 to 10% is reduced to reduce the amount of extracted light, as shown in FIG. 28. This reduction contributes to an improvement in the uniformity of light. Therefore, density-attenuated regions having a lower pattern-density than other regions around the density-attenuated regions are formed on the upper or lower surface of the light guide plate 200 at the opposite longitudinal ends of the first side surface 202. Because these density-attenuated regions are formed at regions brighter than regions having a constant density, to reduce the pattern-density at the bright regions, it is possible to minimize a brightness deviation at the light emission surface.

Therefore, referring to FIGS. 17, 18, and 28, a plurality of spaced density-reinforced regions having a higher pattern-density than other regions around the density-reinforced regions or a plurality of spaced density-attenuated regions having a lower pattern-density than other regions around the density-attenuated regions are formed on the upper or lower surface of the light guide plate 200 extending from the first side surface 202.

In more detail, the pattern-density of the density-attenuated regions can be determined to be lower than the pattern-density of regions other than the density-reinforced regions by 5 to 10%. Also, it is preferable, based on the graph of FIG. 28, that the density-attenuated regions are arranged in areas spaced apart from respective ends of the light incidence part 210 by a distance range corresponding to 5 to 20% of the width of the light incidence part 210. In addition, the width of the light incidence part 210 corresponds to the width (X-axis length) of the light guide plate 200.

Further, the region "D" in FIG. 27 representing the end section of the light guide plate 200 opposite to the light incidence part 210 has dark portions. Thus, the pattern-density at the opposite end is increased, and then decreased to about an original density to achieve an improvement in the uniformity of light at the light emission surface.

Figure 29:
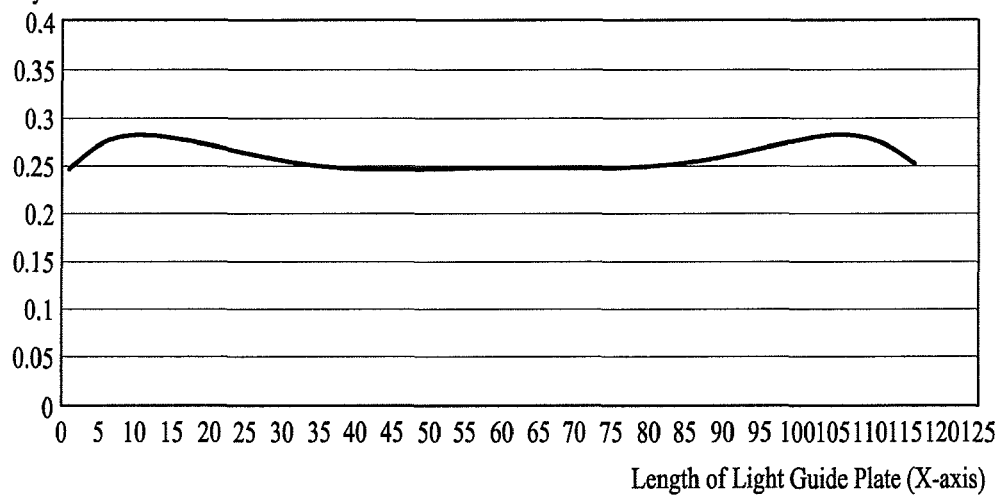
FIG. 29 is a graph depicting a pattern-density variation at a region "D" of FIG. 21.

In addition, one reason for the formation of such dark portions is that the distance of the light guide plate 200 from the light source unit 400 is relatively increased. Based on the graph of FIG. 29, regions where the pattern-density is increased, and then decreased, as described above, can be arranged in areas spaced apart from respective ends of the end section of the light guide plate 200 opposite to the light incidence part 210 by a distance range corresponding to 5 to 30% of the width of the end section opposite to the light incidence part 210.

Such density-reinforced regions may also be referred to as "opposite-end-side density-reinforced regions," because they are arranged at opposite longitudinal ends of the end section of the light guide plate 200 at the side of the second side surface 204. The opposite-end-side density-reinforced regions also have a pattern-density that is gradually increased and then gradually decreased.

Further, in the opposite-end-side density-reinforced regions, it is preferable that the pattern-density is increased to a degree higher than the pattern-density at the second side surface of the light guide plate 200 by 5 to 10%, and then decreased to a degree equal to about the pattern-density at the middle portion of the light guide plate 200.

In addition, respective highest-density portions of the opposite-end-side density-reinforced regions can be arranged at positions respectively spaced apart from the opposite longitudinal ends of the end section of the light guide plate 200 at the side of the second side surface 204 by 7 to 11% of the width of the second side surface 204. Also, referring to FIG. 29, it can be seen that the highest-density portions are arranged at positions spaced apart from the opposite longitudinal ends of the end section of the light guide plate 200 at the side of the second side surface 204 by 9% of the width of the second side surface 204.

Figure 30:
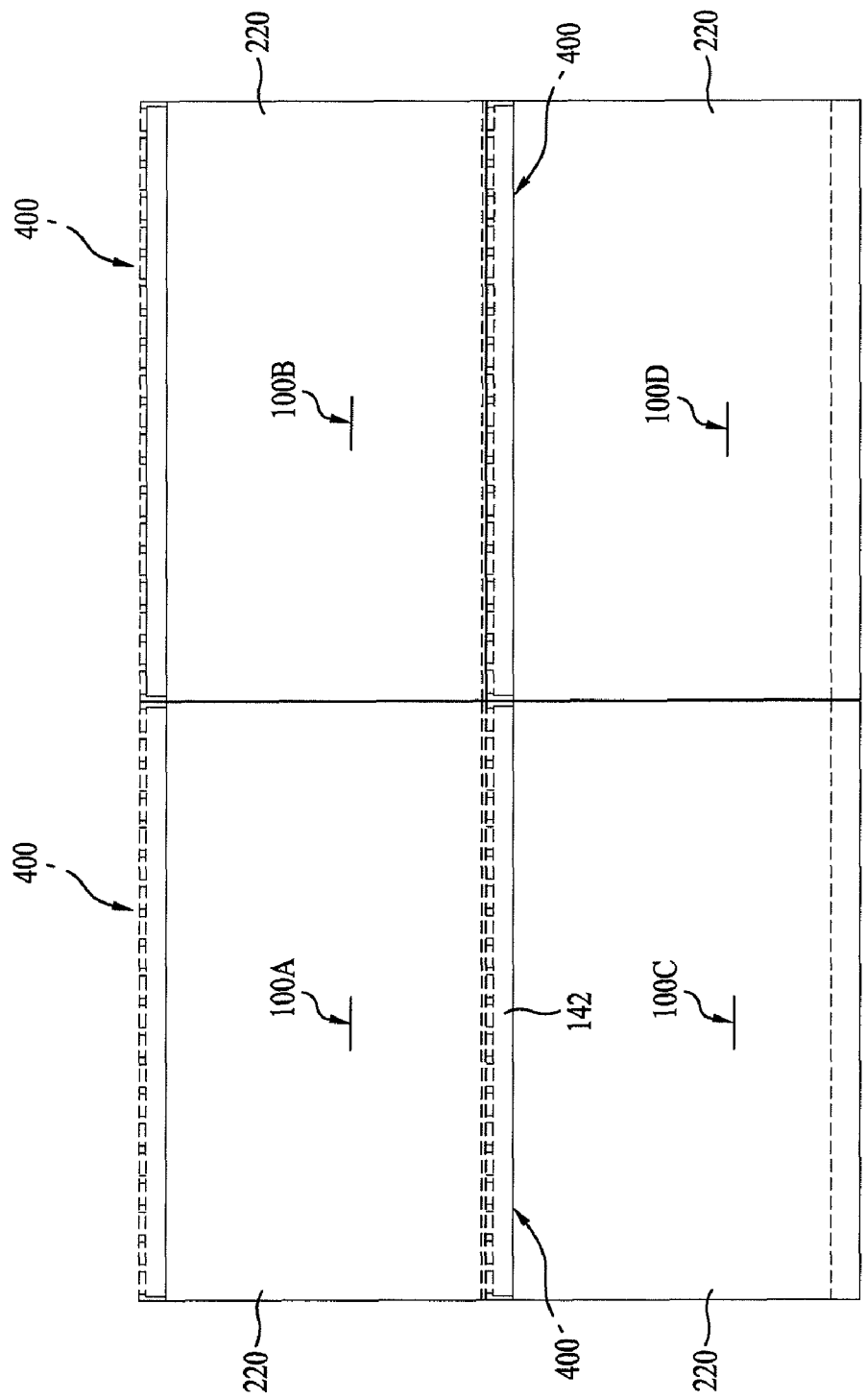
FIG. 30 is a plan view illustrating an example of a block type back-light unit according to an embodiment of the present invention.

The light guide plate 200 having the above-described light extraction patterns can be designed to have a small-size block structure as shown in FIG. 30. Such light guide plates having the block structure can be arranged adjacent to one another while being connected to one another such that they are optically coupled to constitute a large-size back-light unit. In this instance, the uniformity of light emitted from the block type back-light unit can be considerably improved.

Further, in an alternative embodiment of the present invention, the patterns are not formed on the upper or lower surface of the light guide plate but are integrated with the light guide plate 200. That is, the back-light unit according to an embodiment of the present invention include substrates, a plurality of LED light sources arranged on each substrate, and N (N≧2) light guide plates each including a light incidence part having a light incidence surface, to which light from the LED light sources is incident, and a light emission part, from which the incident light is upwardly emitted. The light emission part is connected, at one side thereof, to the light incidence part. The back-light unit also includes reflection plates respectively arranged at lower surfaces of the light guide plates, and patterns arranged between each reflection plate and the lower surface of the light guide plate corresponding to the reflection plate.

Further, at least a portion of the light emission part in a K-th (K=1, 2, . . . , N−1) one of the light guide plates is arranged over the light incidence part of a "K+1"-th one of the light guide plates. Each reflection plate is spaced apart from the lower surface of the corresponding light guide plate by the patterns. The patterns can also have a density-reinforced region having a higher pattern-density than other regions around the density-reinforced region. The patterns are arranged between the reflection plate and the lower surface of the light guide plate, different from the previous embodiments. Also, the patterns may space the light guide plate and reflection plate apart from each other. The patterns may be formed such that they are not integrated with the light guide plate.

For example, the patterns can be provided at the upper or lower surface of the light guide plate, etc. using a bonding or printing method. Where the patterns are integrated with the light guide plate, the patterns can be formed on the lower surface of the light guide plate in a process of manufacturing the light guide plate in accordance with an injection molding method, for example.

Also, the patterns can be provided at the upper or lower surface of the reflection plate such that they are integrated with the reflection plate, in addition to the light guide plate. In this instance, the patterns can be separately provided using a bonding or printing method. In addition, where the patterns are separately provided between the reflection plate and the lower surface of the light guide plate opposite to the light emission surface, the light guide plate and reflection plate can be spaced apart from each other by a predetermined spacing due to the patterns.

Similarly to the previous embodiments, the patterns can have a density-reinforced region having a higher pattern-density than other regions around the density-reinforced region. Further, to achieve an improvement in brightness uniformity, separate patterns can be provided using a printing or bonding method in addition to the groove-shaped patterns formed at the lower surface of the light guide plate, etc.

Also, when the light guide plate is divided into a first part arranged adjacent to the first side surface or light incidence part, a second part arranged opposite to the first part, and a third part arranged between the first and second parts, the density-reinforced region can be provided at a region corresponding to the first part or a region corresponding to the third part.

Further, the first part can be arranged in an area spaced apart from the light incidence part by a distance range corresponding to 0 to 30% of the distance from the light incidence part to the end section of the light guide plate opposite to the light incidence part. The third part can also be arranged in an area spaced apart from the light incidence part by a distance range corresponding to 30 to 70% of the distance from the light incidence part to the end section of the light guide plate.

In addition, the second part can be arranged in an area spaced apart from the light incidence part by a distance range corresponding to 70 to 100% of the distance from the light incidence part to the end section of the light guide plate. That is, when the area of the light guide plate is divided into 3 equal parts in a light travel direction, the density-reinforced region can be provided at the first part or second part. The density-reinforced region can also be arranged in an area spaced apart from the light incidence part by a distance range corresponding to 3 to 10% of the distance from the light incidence part to the end section of the light guide plate.

In addition, FIG. 30 illustrates a configuration in which four back-light blocks A, B, C and D are coupled together while being arranged adjacent to one another. Further, a light source unit 400 is arranged at one side of each back-light block. Also, to obtain a maximum contrast ratio, the back-light blocks can be independently driven.

As shown in FIGS. 3 and 30, the back-light unit for a display device is configured by a combination of a plurality of back-light blocks. As described above, this back-light unit include substrates, light sources arranged on each substrate to emit light through a certain orientation angle in a first direction, and N (N≧2) light guide plates each including a light incidence part having a light incidence surface, to which light from the light source is laterally incident, and a light emission part, from which the incident light is upwardly emitted.

The light emission part is connected, at one side thereof, to the light incidence part. Further, at least a portion of the light emission part in a K-th (K=1, 2, . . . , N−1) one of the light guide plates is arranged over the light incidence part of a "K+1"-th one of the light guide plates. The light emission part of each light guide plate also has a thickness gradually reduced as the light emission part extends from one side adjacent to the light incidence part of the light guide plate to the other side opposite to the light incidence part of the light guide plate. In addition, each light guide plate can include patterns as discussed above.

In accordance with this arrangement, the light emission surfaces of the light guide plates are connected together. Also, formation of bright/dark lines at connections between adjacent blocks can be reduced or eliminated in accordance with the optical coupling of the blocks. Furthermore, formation of bright/dart lines in each block can be reduced or eliminated by virtue of the above-described light extraction patterns. Thus, a considerable improvement in light uniformity at the entire light emission surface of the back-light unit is achieved.

Figure 31:
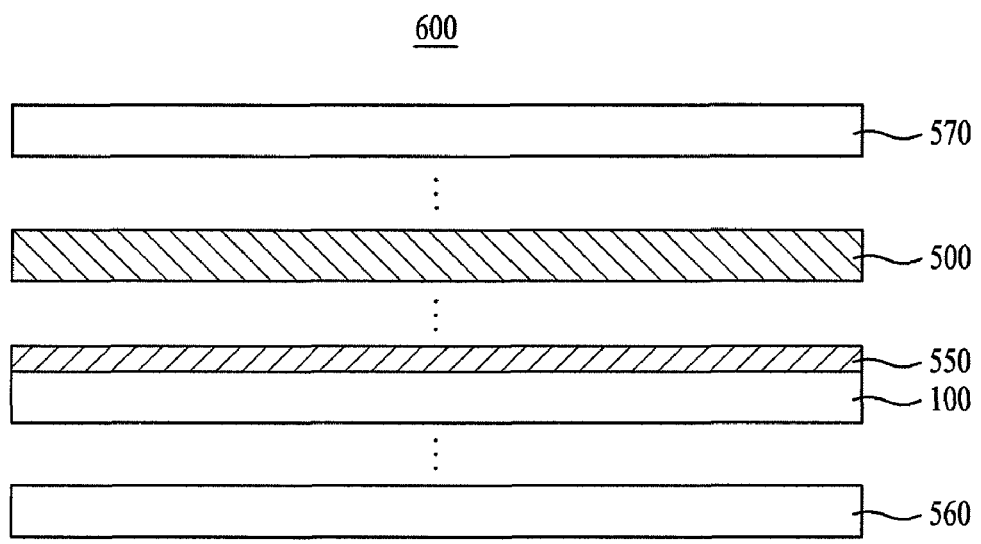
FIG. 31 is a sectional view illustrating an example of a display device including the back-light unit according to an embodiment of the present invention.
Figure 32:
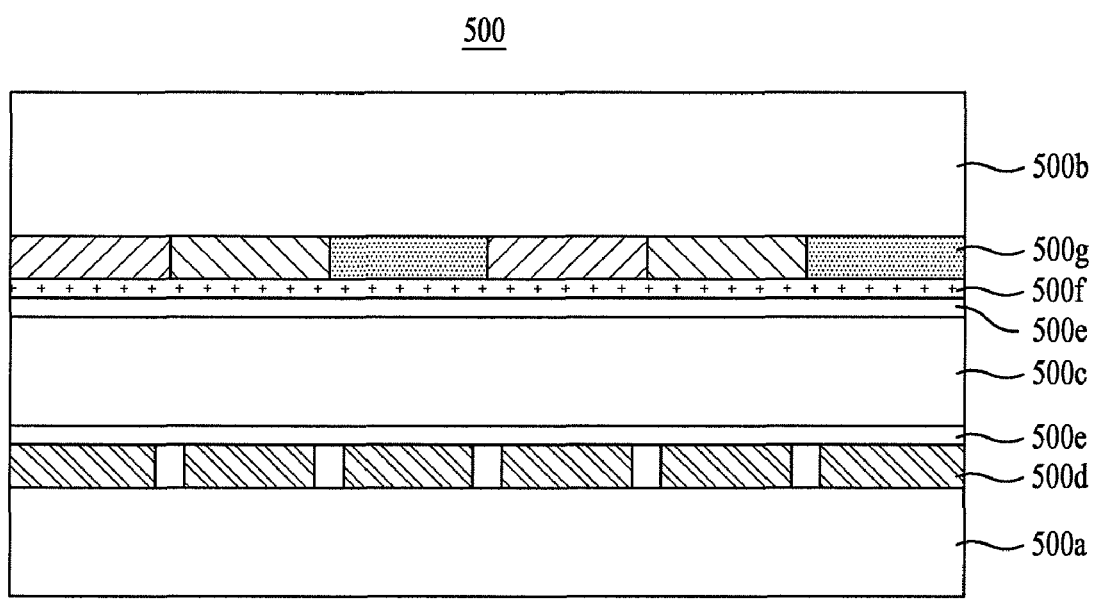
FIG. 32 is a sectional view illustrating an example of a liquid crystal panel constituting the display device according to an embodiment of the present invention.

Next, FIG. 31 is a sectional view illustrating an example of a display device including the back-light unit according to an embodiment of the present invention, and FIG. 32 is a sectional view illustrating an example of a liquid crystal panel constituting the display device according to an embodiment of the present invention.

As shown in FIGS. 31 and 32, the display device 600 uses the back-light unit 100 according to embodiments of the present invention and a liquid crystal panel 500. Referring to FIGS. 31 and 32, the liquid crystal panel 500, which is arranged over the back-light unit 100, includes an upper substrate 500a, a lower substrate 500b facing the upper substrate 500a, and a liquid crystal layer 500c injected between the upper and lower substrates 500a and 500b.

A driver to drive the liquid crystal panel 500 can also arranged at one side of the liquid crystal panel 500. Further, a rear cover 560 is arranged to cover the back-light unit 100, and an upper cover 570 is provided at the top of the liquid crystal panel 500 to cover the front surface of the liquid crystal panel 500 (the upper surface in FIG. 32).

Further, the liquid crystal panel 500 includes liquid crystal cells arranged in the form of a matrix, and each liquid crystal cell forms a unit pixel. Also, the light transmittance rates of the liquid crystal cells are controlled in accordance with image signal information sent from the driver to form an image. The driver can also include a flexible printed circuit board (FPC), a driving chip mounted on the FPC, and a printed circuit board (PCB) connected to the FPC.

Meanwhile, as shown in FIG. 31, the back-light unit 100 is arranged at the back side of the liquid crystal panel 500 (the bottom side in FIG. 31). A plurality of optical sheets 550 are also arranged on the back-light unit 100. Further, the optical sheets 550 are arranged on the back surface of the liquid crystal panel 500, and in this embodiment as shown in FIG. 32, include a diffusion sheet 550a, a prism sheet 550b, and a protection sheet 550c.

In addition, the diffusion sheet 550a diffuses light emitted from the back-light unit 100, and supplies the diffused light to the liquid crystal panel 500. The prism sheet 550b is also provided with triangular prisms formed on an upper surface of the prism sheet 550b while forming a certain pattern. The prism sheet 550b condenses the diffused light emerging from the diffusion sheet 550a in a direction perpendicular to the plane of the liquid crystal panel 500 arranged over the prism sheet 550b.

Further, the micro prisms formed on the prism sheet 550b have a certain angle. Also, most beams of light emerging from the prism sheet 550b travel in a direction perpendicular to the plane of the prism sheet 550b so that a uniform brightness distribution may be obtained. Also, the protection sheet 550c, which is arranged at an uppermost position, protects the prism sheet 550b from being scratched, for example.

Further, in FIG. 32, a plurality of gate lines and a plurality of data lines are formed in the form of a matrix on the lower substrate 500a of the liquid crystal panel 500. A pixel electrode and a thin film transistor (TFT) 500d are formed at each intersection of the gate lines and data lines. A signal voltage applied through the thin film transistor 200d is also supplied to the liquid crystal layer 500c by the pixel electrode. In addition, in accordance with the signal voltage, the light transmittance rate of the liquid crystal layer 500c is determined.

Also formed on the upper substrate 500b are a color filter 500g constituted by RGB pixels to express color when light passes through the color filter 500g, and a common electrode 500f made of a transparent conductive material such as indium tin oxide (ITO) or indium zinc oxide (IZO). Alignment films 500e are also arranged over and beneath the liquid crystal layer 500c.

Figure 33:
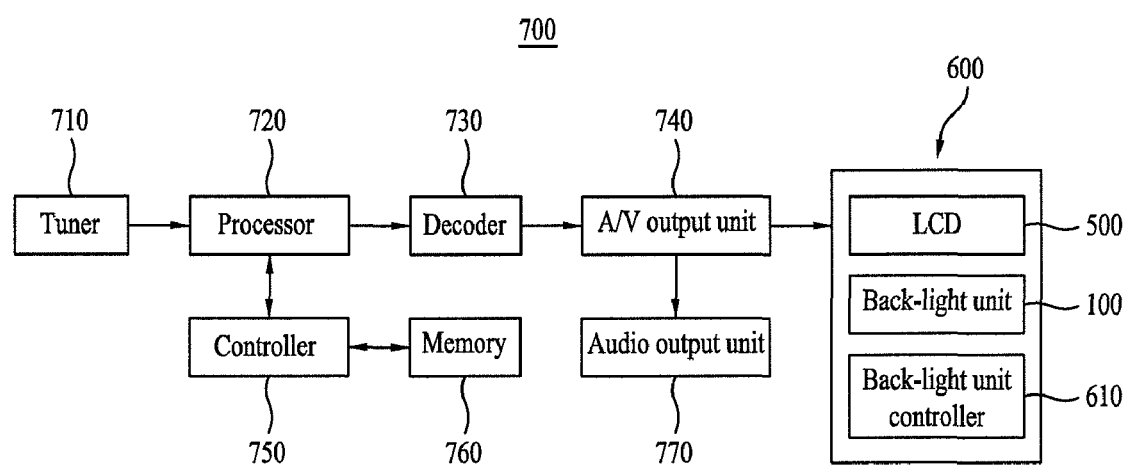
FIG. 33 is a block diagram illustrating a liquid crystal television (TV) as an example of the display device according to an embodiment of the present invention.

Next, FIG. 33 is a block diagram illustrating a liquid crystal television (TV) 700 as an example of the display device according to an embodiment of the present invention. In the liquid crystal TV 700 shown in FIG. 33, a broadcast data stream, for example, received by a tuner 710 is transmitted to the display device 600 via a processor 720, a decoder 730, and an audio/video (A/V) output unit 740 so as to be outputted in the form of audio and video.

The tuner 710 and processor 720 are controlled by a controller 750. Further, the controller 750 interfaces with a memory 760. When the user designates a desired broadcasting channel by operating the liquid crystal TV 700, the controller 750 controls the tuner 710 and processor 720 to select the designated broadcast channel. The processor 720 then separates a data stream of a broadcast program supplied over the broadcasting channel into audio and video data, and outputs the audio and video data.

The decoder 730 then decodes the audio and video data output from the processor 720 into audio and video signals. The audio and video signals are then output through the display device 600 and/or an audio output unit 770 such as a speaker unit, by the A/V output unit 740. In this instance, the back-light unit 100 is driven by a back-light unit controller 610 to supply light to the liquid crystal panel 500, and thus to enable the liquid crystal panel 500 to display an image output thereto. Further, the broadcast data steam, which is sent to the processor 520, can be provided through the Internet.

In addition, as shown in FIGS. 3 and 16, a corresponding light source 410 is a light emitting diode (LED) source, the LED source 410 has a top surface and a bottom surface that are opposite surfaces and side surfaces between the top surface and the bottom surface, and light is emitted from at least one of the side surfaces.

In the above-described embodiments of the present invention, the light guide plates having a particular size are combined in the form of an array so as to be applied to a large-size back-light unit. In this instance, each light guide plate and the back-light unit may have various sizes in accordance with products to which light guide plate and the back-light unit are applied.

As apparent from the above description, the present invention can reduce or eliminate formation of bright/dart lines at the light incidence part of each light guide plate. When a large-size back-light unit is configured using light guide plates as unit blocks, it is possible to reduce or eliminate formation of bright/dart lines between adjacent blocks. Thus, it is possible to considerably improve the light uniformity of the back-light unit or the light uniformity of a display device using the back-light unit.

It will be apparent to those skilled in the art that various modifications and variations can be made in the present application without departing from the spirit or scope of the inventions. Thus, it is intended that the present application covers the modifications and variations of this invention provided they come within the scope of the appended claims and their equivalents.

What is claimed is:

1. A back-light unit comprising:
a plurality of substrates; a plurality of light sources respectively disposed on the plurality of substrates and configured to emit light; and
N light guide plates respectively disposed adjacent to the plurality of light sources, each light guide plate including a light incidence part having a light incidence surface for receiving light emitted in a first direction from a corresponding light source, and a light emission part for emitting the received incident light in a second direction different than the first direction, where N is greater than or equal to 2,
wherein at least one of the light guide plates comprises light-extracting surface patterns disposed on the light emission part,
wherein the light-extracting surface patterns comprise a first region of light-extracting surface patterns having a higher pattern-density than a second region of light-extracting surface patterns next to the first region and a third region of light-extracting surface patterns having a higher pattern-density than the second region of light-extracting surface patterns, and wherein the third region of light-extracting surface patterns is next to the second region of surface patterns.

2. The back-light unit of claim 1, wherein at least a portion of the light emission part in a K-th one of the light guide plates overlaps the light incidence part of a "K+1"-th one of the light guide plates, where K is smaller than or equal to N−1.

3. The back-light unit of claim 1, wherein the light emission part of each light guide plate has a portion having a thickness changed from one side next to the light incidence part to the other side opposite to the light incidence part.

4. The back-light unit of claim 1, wherein the light emission part of each light guide plate has a portion having a thickness reduced from one side next to the light incidence part to the other side opposite to the light incidence part.

5. The back-light unit of claim 1, wherein the first region of light-extracting surface patterns is closer to the light incident part than the second region of light-extracting surface patterns.

6. The back-light unit of claim 1, wherein the third region of light-extracting surface patterns has a higher pattern-density than the first region of light-extracting surface patterns.

7. The back-light unit of claim 1, wherein the first region is located within a distance range corresponding to about 0 to 25% of the length of the light emission part.

8. The back-light unit of claim 7, wherein the first region is located within a distance range corresponding to about 3 to 10% of the length of the light emission part.

9. The back-light unit of claim 1, wherein the third region is located within a distance range corresponding to about 73 to 100% of the length of the light emission part.

10. The back-light unit of claim 1, wherein the light-extracting surface patterns are disposed on at least one an upper and lower surface of the light emission part of said at least one of the light guide plates.

11. The back-light unit of claim 1, wherein the light-extracting surface patterns have at least one of a dot structure, a pyramidal structure, a conical structure, a cylindrical structure, a prismatic structure, an oval structure, and a bur structure.

12. The back-light unit of claim 1, wherein the light-extracting surface patterns comprise equally-spaced patterns or semi-random patterns that are not overlapped with one another while having a constant average inter-pattern spacing.

13. The back-light unit of claim 1, wherein the density of the light-extracting surface patterns is expressed in the form of a curve function to a distance from said one side of the light emission part in a direction toward the other side of the light emission part.

14. The back-light unit of claim 13, wherein the curve function has at least two inflection points.

15. The back-light unit of claim 1, wherein a corresponding light source is a light emitting diode (LED) source, the LED source has a top surface and a bottom surface that are opposite surfaces and side surfaces between the top surface and the bottom surface, and light is emitted from at least one of the side surfaces.

16. The back-light unit of claim 1, wherein a plurality of insert protrusions are provided at the light guide plate, and wherein a plurality of insert grooves are provided at the substrate to receive insert protrusions for position determination to determine the positions of the light guide plate and substrate.

17. The back-light unit of claim 16, wherein the plurality of insert protrusions are provided at a lower surface of the light incidence part of the light guide plate and are spaced apart from one another.

18. The back-light unit of claim 15, wherein the LED sources mounted to the substrate are arranged such that they are spaced apart from one another by a predetermined spacing.

19. The back-light unit of claim 18, wherein the LED sources are arranged such that they are irregularly spaced apart from one another in a longitudinal direction of the side surface of the light incidence part.

\* \* \* \* \*